United States Patent [19]

Shishido

[11] Patent Number: 4,538,062
[45] Date of Patent: Aug. 27, 1985

[54] FOCUSING DETECTING DEVICE WITH COAXIAL SOURCE AND DETECTOR

[75] Inventor: Yoshio Shishido, Tokyo, Japan

[73] Assignee: Olympus Optical Co., Ltd., Tokyo, Japan

[21] Appl. No.: 442,087

[22] Filed: Nov. 16, 1982

[30] Foreign Application Priority Data

| Nov. 19, 1981 | [JP] | Japan | 56-185980 |
| Nov. 20, 1981 | [JP] | Japan | 56-186530 |
| Nov. 20, 1981 | [JP] | Japan | 56-186531 |
| Jan. 14, 1982 | [JP] | Japan | 57-4117 |
| Jan. 20, 1982 | [JP] | Japan | 57-13774 |

[51] Int. Cl.³ .............................. G01J 1/20
[52] U.S. Cl. .................... 250/201; 250/204
[58] Field of Search ............ 250/201 AF, 201 PF, 250/201 DF, 204; 354/404; 356/1, 4

[56] References Cited

U.S. PATENT DOCUMENTS

| 3,918,071 | 11/1975 | Albrecht | 354/404 |
| 3,969,575 | 7/1976 | Gerritsen et al. | 250/201 |
| 4,152,586 | 5/1979 | Elliott et al. | 250/204 |
| 4,357,533 | 11/1982 | Winslow | 250/204 |

Primary Examiner—David C. Nelms
Assistant Examiner—J. Jon Brophy
Attorney, Agent, or Firm—Kenyon & Kenyon

[57] ABSTRACT

The focusing detecting device determines whether or not the optical image of an object to be photographed is in a focusing state in which the image is clearly formed on a predetermined image forming surface through a photographing or image forming optical system. The device can be used with a dark optical system.

31 Claims, 43 Drawing Figures

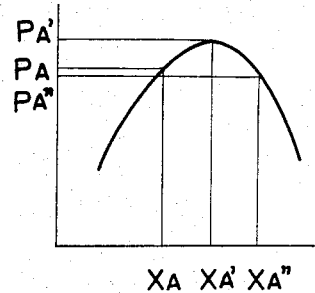
FIG. 32(a)
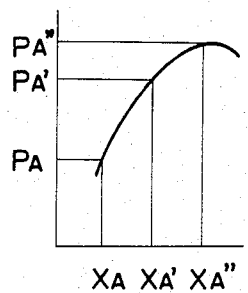
FIG. 32(b)
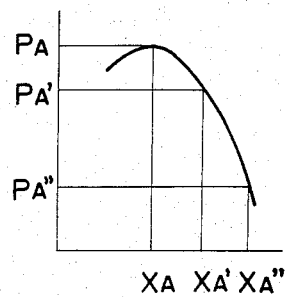
FIG. 32(c)
FIG. 33
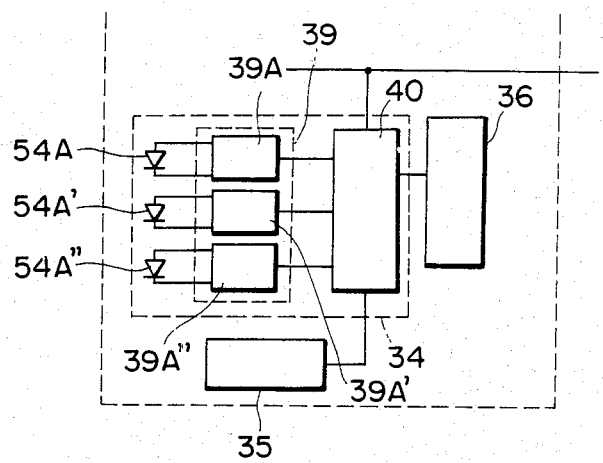

FOCUSING DETECTING DEVICE WITH COAXIAL SOURCE AND DETECTOR

This invention relates to a focusing detecting device. More particularly, this invention relates to a focusing detecting device and a focusing setting device for use in optical devices.

BACKGROUND OF THE INVENTION

In an observing or photographing optical device, several means have been suggested for detecting whether a photographing or image forming optical system is in a focusing state for clearly forming the image of an object to be photographed on a predetermined image forming surface or not. However, in case the object to be photographed is dark or in case a dark photographing optical system is used, the detecting output will be small and the focusing detection will be substantially impossible. In order to eliminate this defect, a light projecting means has been provided for the focusing detection. However, the structure is complicated, costly and bulky.

Generally, in such optical observing devices and optical photographing devices as endoscopes, cameras and television cameras it is important to determine whether or not the image forming position of the optical system of the device is in a focusing state coinciding with the predetermined image forming position on a film surface so that an object to be photographed may be clearly observed or photographed. Therefore, in some cases, a means of detecting whether or not the optical system is in a focusing state (hereinafter a focusing detecting device) has been provided. In other cases, a focusing setting device has been provided wherein an optical system is moved by a detecting signal of a focusing detecting device so as to automatically set the optical system in a focusing state.

In a conventional focusing detecting device, use has been made of a photoelectric element with a photoelectric converting function to receive a light. However, in case an object to be photographed is dark or in case a dark photographing optical system is used, the detecting output of the photoelectric element will be so small that the focusing detection will be substantially impossible.

Japanese Patent Publication No. 19810/1974 describes a means of projecting a beam of a fixed shape toward an object to be photographed. However, as an optical system independent of a photographing lens system is used for the projecting part, such can not be applied to an endoscope or the like in which photographing must be made in one light path.

Japanese Patent Laid Open No. 128923/1981 describes a means in which a split prism is used as a detecting device. In this case, at least two upper and lower minute photoelectric elements are required. As a result, there are problems which arise, in case a precision above a fixed level is required, as many of the above mentioned photoelectric elements will have to be arranged, the circuit system for detecting whether focusing is made or not by comparing their output signals will be complicated and, particularly, the products low in the production number will be costly.

Further, Japanese Patent Laid Open No. 125713/1981 describes a focusing detecting device wherein lights are projected onto an object to be photographed by flickering a light source. In this case, output signals in the extinguished sections are deducted from the output signals in the lighted sections so that the influences of other external lights than of the above mentioned light source may be reduced. However, besides having a predetermined image forming surface as a film surface, positions conjugate with this image forming surface are provided in two places on both sides of the image forming surface so that a light projected onto an object to be photographed by a light projecting means arranged in one place may be received by a light receiving means arranged in the other place. Therefore, there have been problems that comparatively large spaces are required for the light projecting means and light receiving means. Thus, the formation of the optical system and circuit system for focusing detection are complicated and costly.

BRIEF SUMMARY OF THE INVENTION

It is an object of the invention to provide a focusing detecting device whereby focusing can be detected even in a dark object to be photographed or in a photographing or image forming optical system.

It is another object of the invention to provide a focusing detecting device which is simple in structure, can be contained in a small space and can be constructed at a relatively low cost.

It is another object of the invention to provide a focusing detecting device whereby focusing can be detected by using a light path of a photographing or image forming optical system.

It is another object of the invention to provide a focusing detecting device which has a wide range of uses.

Briefly, the invention provides a focusing detecting device for detecting a focusing state of an object to be photographed. The focusing detecting device includes an optical system which defines an optical axis between an image forming surface and the object to be photographed, a light projecting means for projecting light through a small aperture and along the optical axis to the object and a light receiving means having at least one small aperture for receiving light reflected from the object along the optical axis. The light receiving means also has a photoelectric converting surface near a position optically conjugate with the image forming surface.

In one embodiment, the light receiving means is constructed such that the photoelectric converting surface is at the position optically conjugate with the image forming surface and has a small aperture for passage of the reflected light.

In another embodiment, the photoelectric converting surface is positioned behind the aperture while the aperture is in the position optically conjugate with the image forming surface.

In other embodiments, multiple apertures can be used in the light receiving means. In these cases, either the apertures or the photoelectric converting surface is in the position optically conjugate with the image forming surface.

The invention also provides a focusing setting device which is operatively connected with the focusing detecting device so as to permit movement of a lens in the optical system in response to an electric signal output from the photoelectric converting surface.

These and other objects, features and advantages of the invention will become more apparent from the following description taken in conjunction with the accompanying drawings wherein:

FIG. 1 schematically illustrates an optical system of a focusing setting device having a focusing detecting device according to the invention contained in a camera adapter fitted in case a camera is fitted to an endoscope;

Figure 1:
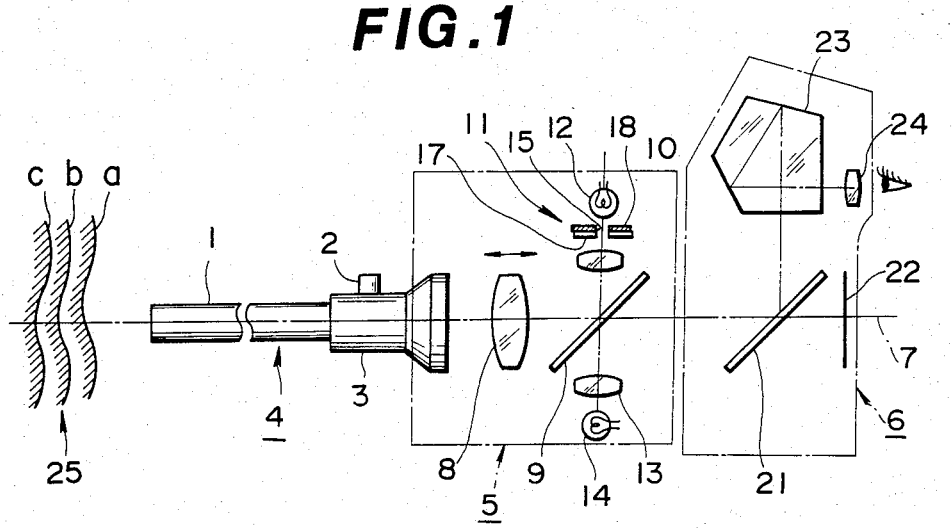
Figure 4:
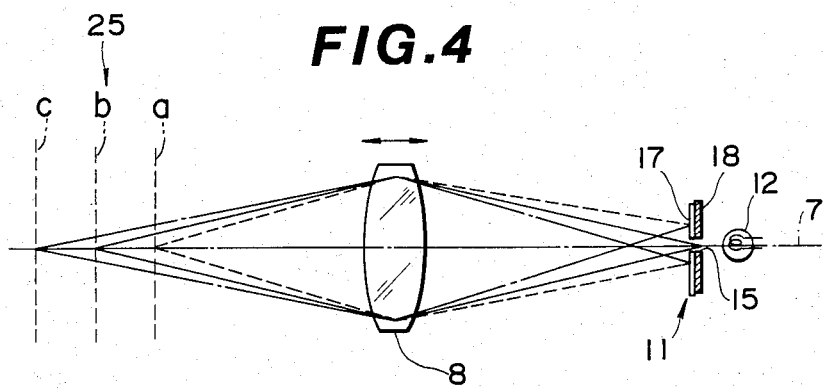
Figure 5:
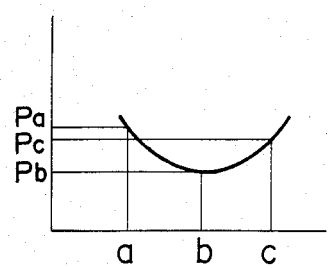
Figure 6:
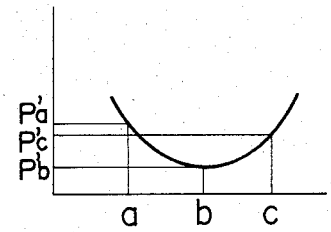
Figure 7:
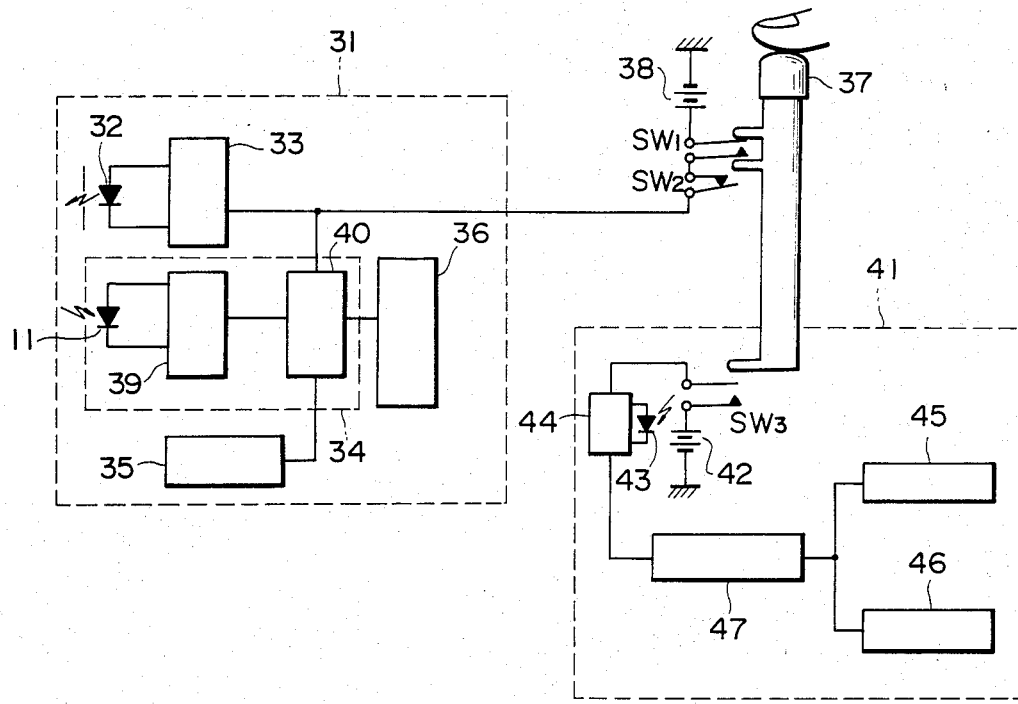
Figure 8:
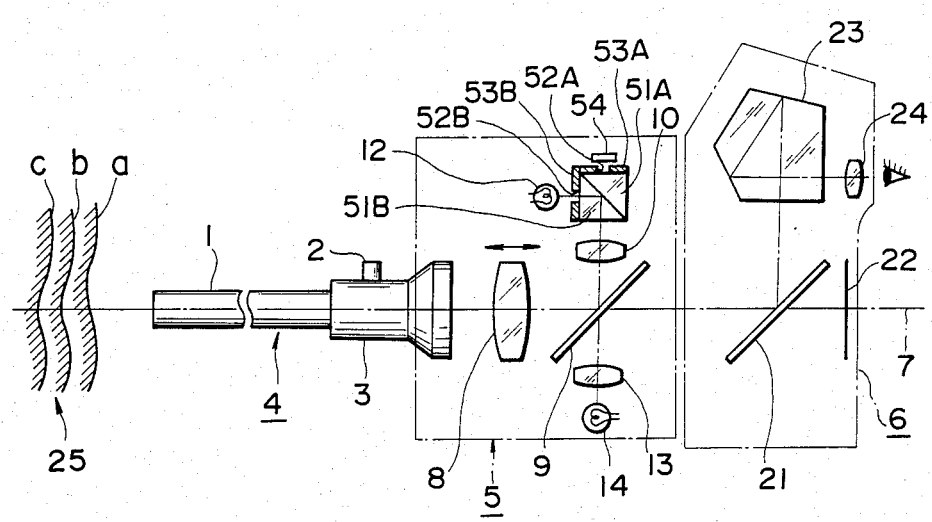
Figure 9A:
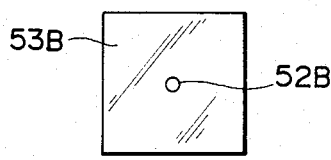
Figure 9B:
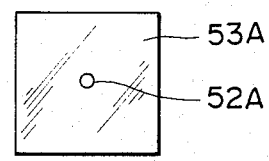
Figure 10:
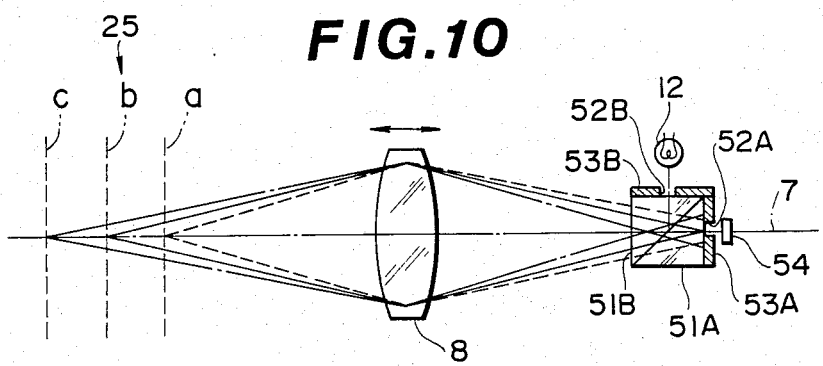
Figure 11:
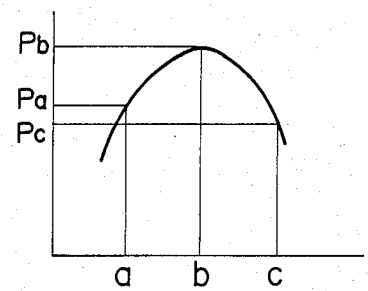
Figure 12:
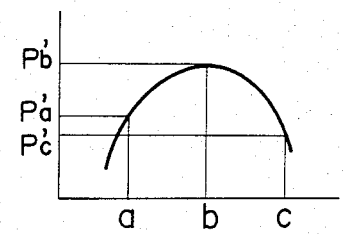
Figure 13:
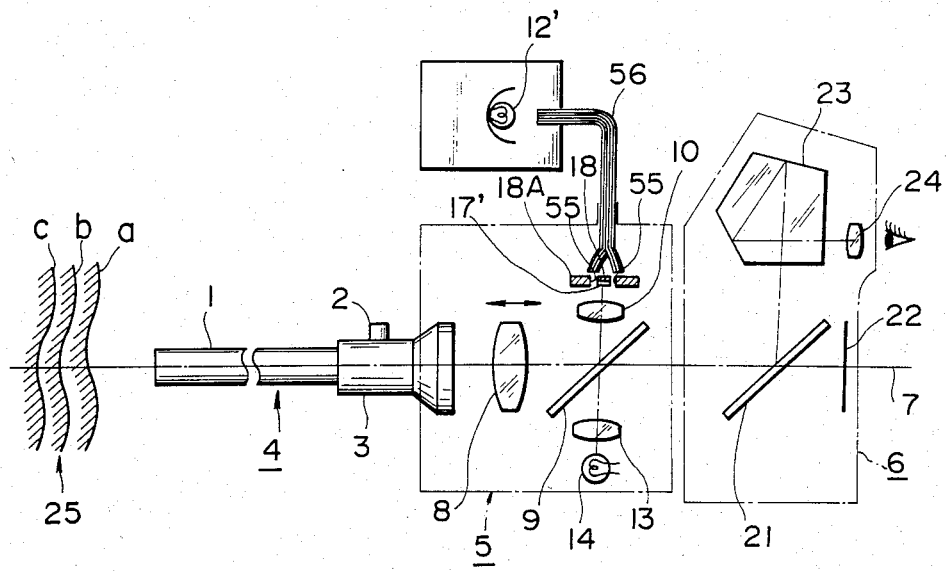
Figure 14:
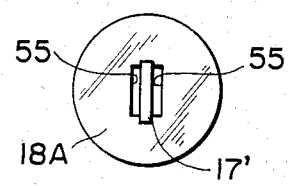
Figure 15:
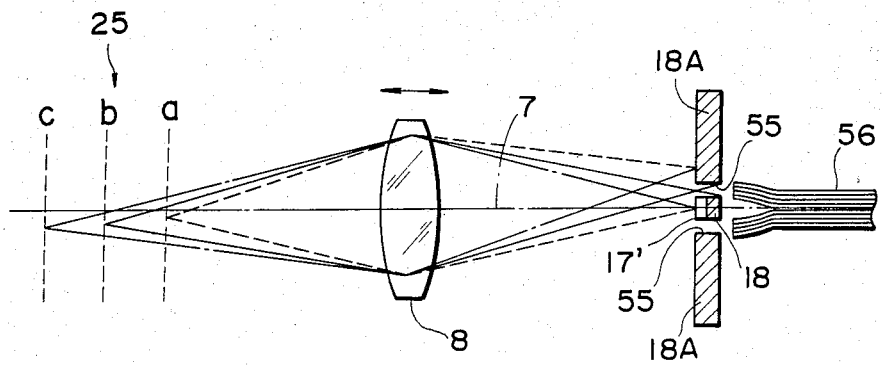
Figure 16:
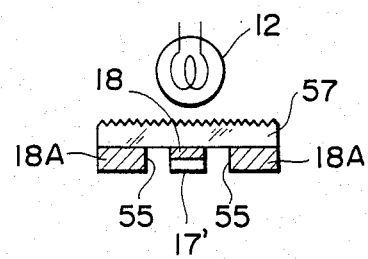
Figure 17A:
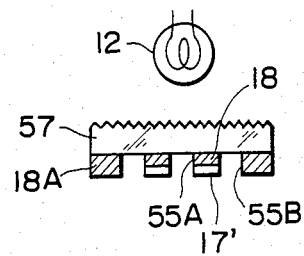

FIG. 4 schematically illustrates the focusing detecting operation of the optical system in FIG. 1 converted to that of a linear optical system;

FIG. 5 graphically illustrates the output characteristics of a photoelectric element in case the position of an object to be photographed in an optical system is changed;

FIG. 6 graphically illustrates the output characteristics of a photoelectric element in case infrared rays are used;

FIG. 7 schematically illustrates a focusing setting device wherein a photographing lens is moved and set in a focusing position by using an electric circuit block and of an automatic exposing device;

FIG. 8 schematically illustrates a modified optical system of a focusing setting device wherein a focusing detecting device is contained in a camera adapter fitted in case a camera is fitted to an endoscope;

FIG. 9 illustrates an elevation view of the shape of an aperture in a light intercepting plate;

FIG. 10 schematically illustrates the operation of the focusing detection in FIG. 8 as converted to that of a linear optical system;

FIG. 11 graphically illustrates the output characteristics of a photoelectric element in case the position of the object to be photographed in FIG. 10 is changed;

FIG. 12 graphically illustrates the output characteristics of a photoelectric element in case a light source of an infrared range is used;

FIG. 13 schematically illustrates an optical system of a third embodiment of the focusing detecting device contained in a camera adapter;

FIG. 14 illustrates an elevation view of the shape of a light receiving means used in FIG. 13;

FIG. 15 schematically illustrates the principle of the focusing detection of the optical system in FIG. 13;

FIG. 16 illustrates a sectioned view of a light projecting means and light receiving means for focusing in a fourth embodiment of the invention;

FIGS. 17(a) and (b) respectively illustrate a sectioned view and elevation view of the parts of a light projecting means and light receiving means for focusing in a fifth embodiment of the invention.

Figure 18:
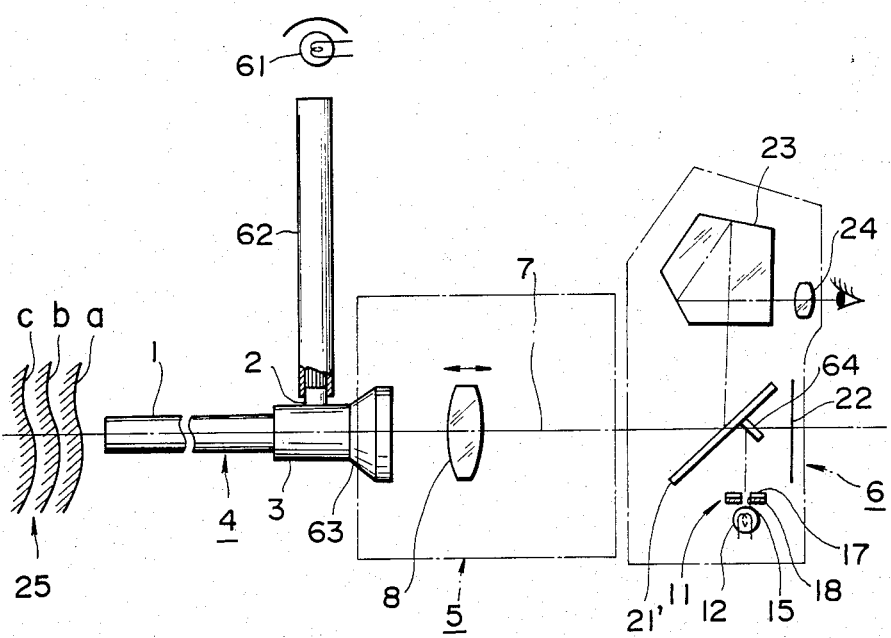
Figure 19:
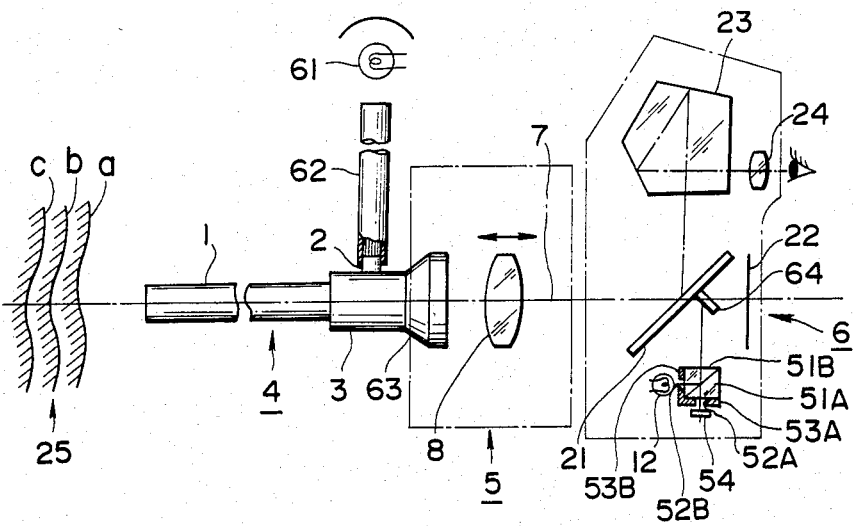
Figure 20:
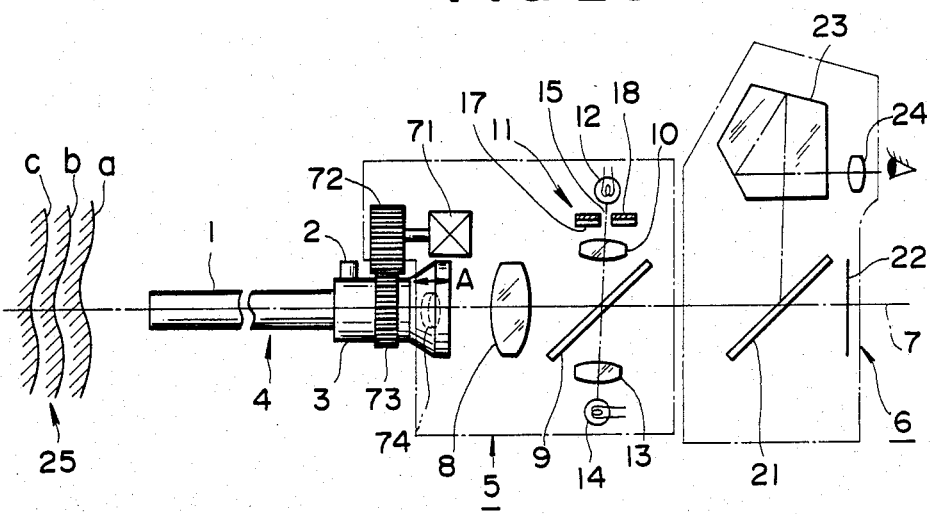
Figure 21:
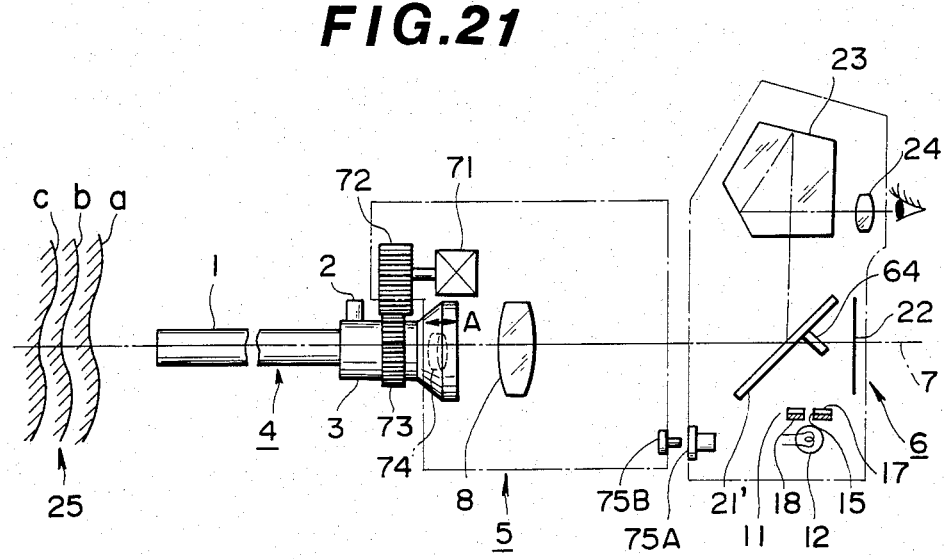
Figure 22:
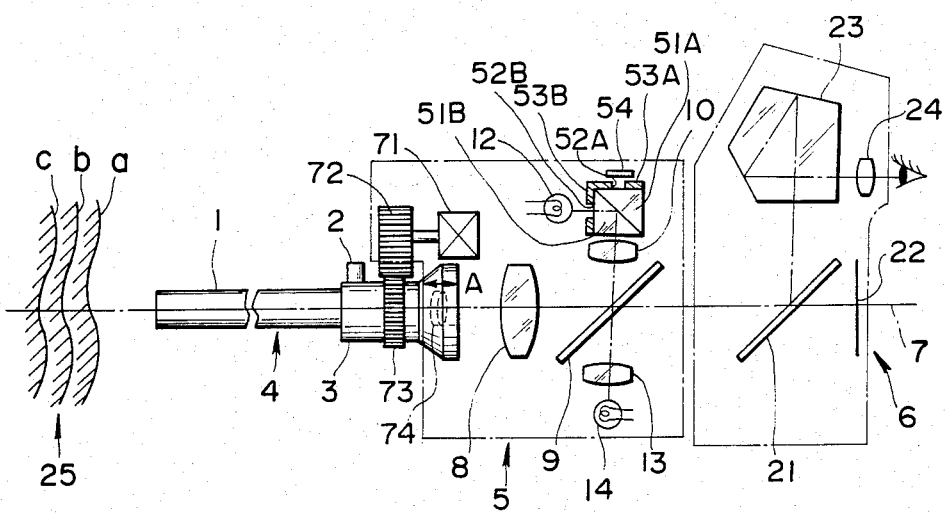
Figure 23:
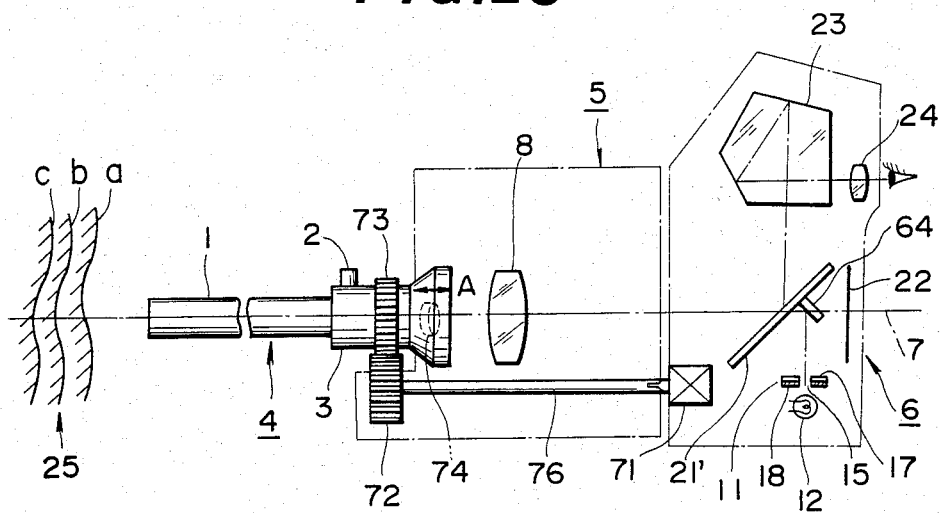
Figure 24:
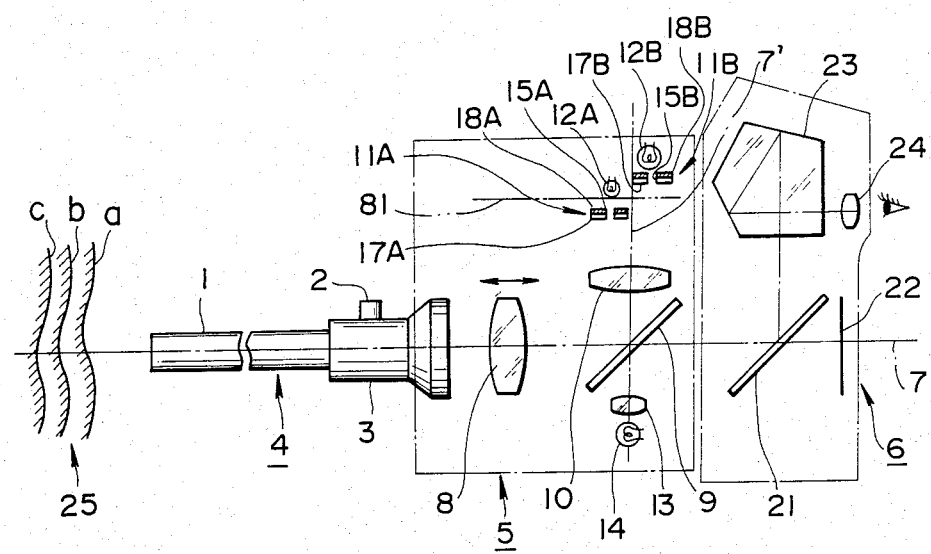
Figure 25:
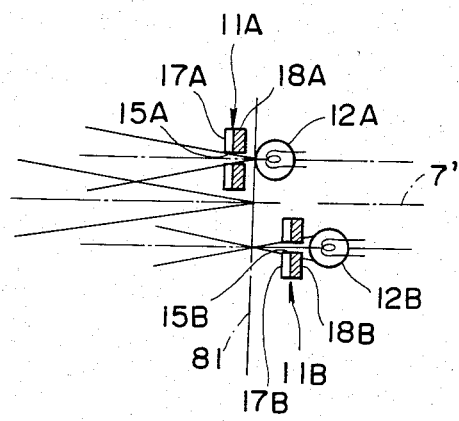
Figure 26A:
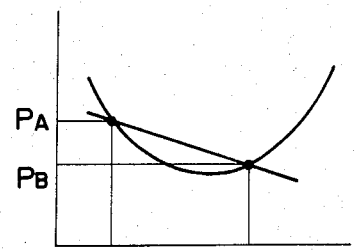
Figure 26B:
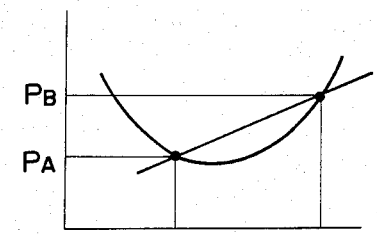
Figure 27:
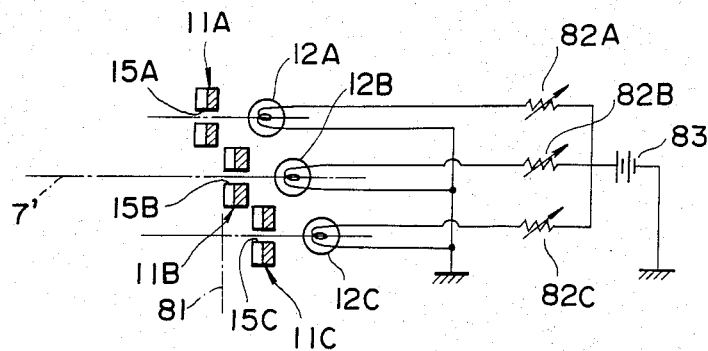
Figure 28:
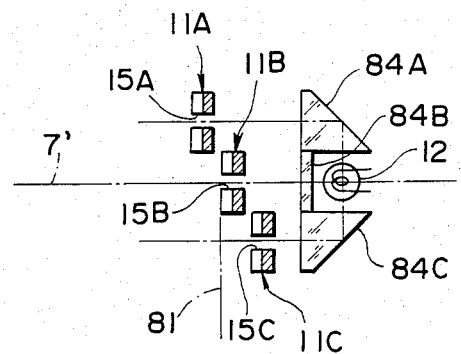
Figure 29:
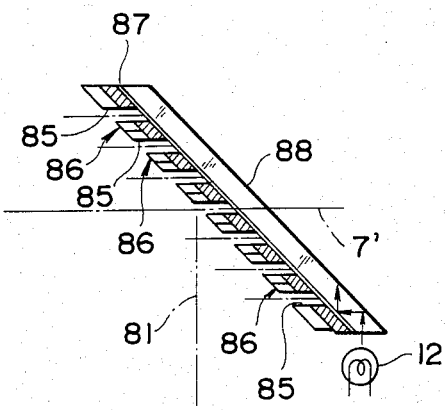
Figure 30:
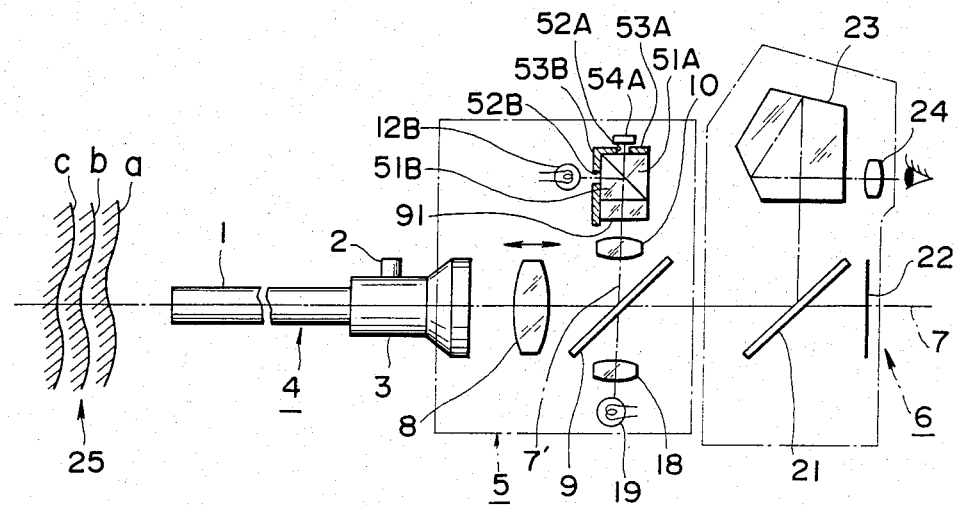
Figure 31A:
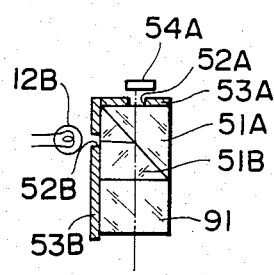
Figure 31B:
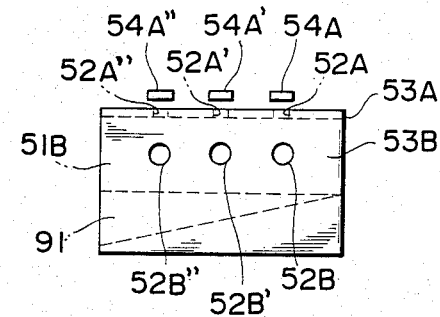
Figure 34:
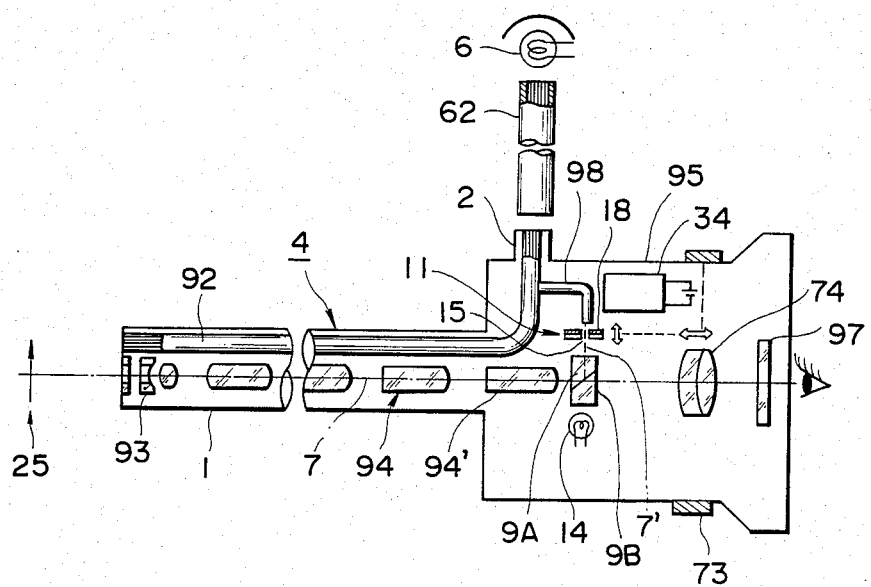
Figure 35:
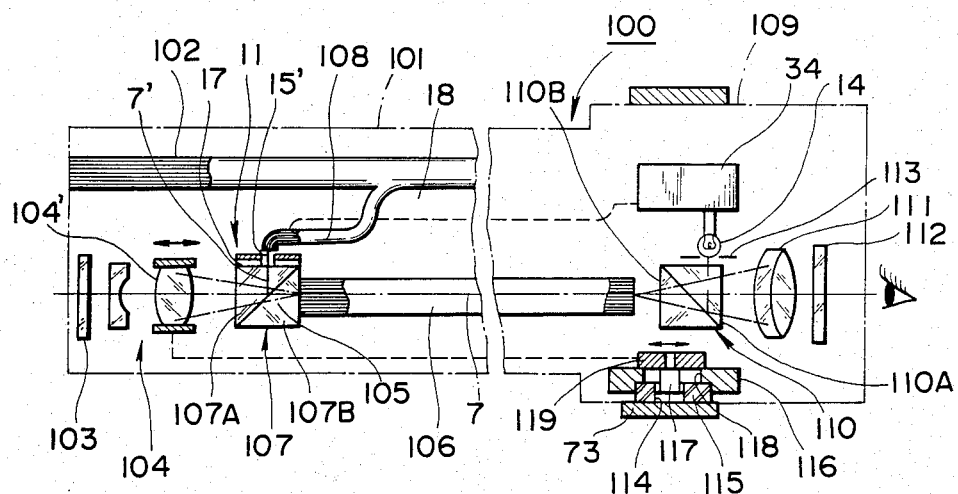
Figure 36:
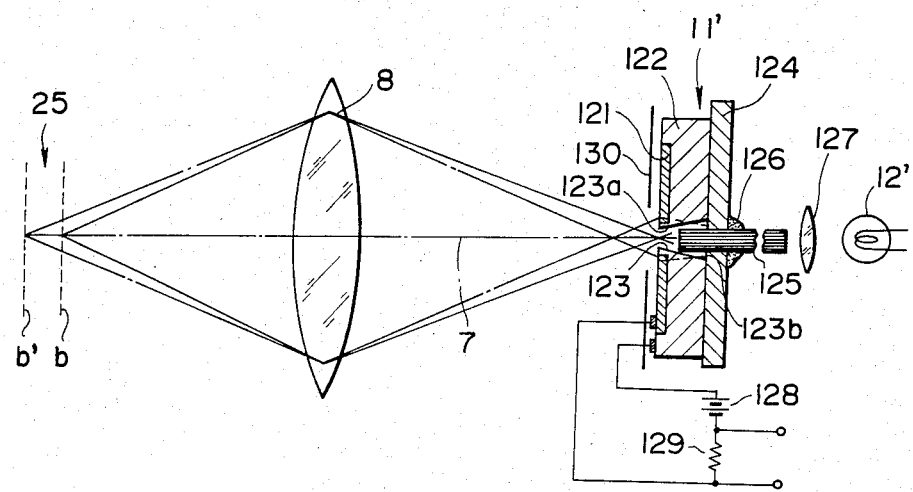
Figure 37:
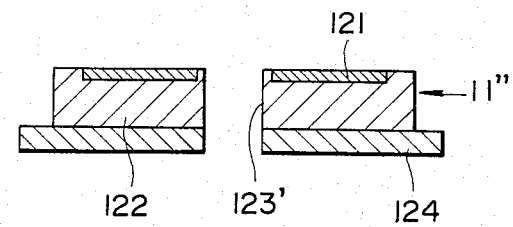

FIG. 18 schematically illustrates a light projecting and receiving means in accordance with the invention contained within a camera;

FIG. 19 schematically illustrates a further embodiment wherein the focusing detecting device is contained within a camera;

FIG. 20 schematically illustrates a further embodiment employing an automatic focusing setting device in accordance with the invention;

FIG. 21 schematically illustrates a further embodiment having an automatic focusing setting device in accordance with the invention;

FIG. 22 illustrates a further embodiment employing an automatic focusing setting device in accordance with the invention;

FIG. 23 illustrates a further embodiment of an automatic focusing setting device in accordance with the invetion;

FIG. 24 schematically illustrates a focusing detecting device employing a pair of photoelectric converting surfaces in accordance with the invention;

FIG. 25 illustrates an enlarged view of the photoelectric converting surfaces employed in the device of FIG. 24;

FIGS. 26(a) and (b) graphically illustrate the output characteristics of a photoelectric element of FIG. 25;

FIG. 27 schematically illustrates a detecting device employing a multiplicity of photoelectric converting surfaces;

FIG. 28 schematically illustrates a variant of the structure of FIG. 27;

FIG. 29 illustrates a view of a further variant of a multiplicity of photoelectric elements in accordance with the invention;

FIG. 30 schematically illustrates a sixteenth embodiment of the invention;

FIGS. 31(a) and (b) are respectively a sectioned view and an elevation view of parts of light projecting and receiving means in FIG. 30;

FIG. 32a, 32b, 32c, graphically illustrate various output relations in focusing and nonfocusing of the device of FIG. 30;

FIG. 33 illustrates a block diagram of a focusing detecting circuit in a focusing setting device using the sixteenth embodiment;

FIG. 34 schematically illustrates a hard endoscope in which an embodiment of the focusing detecting device of the invention is incorporated;

FIG. 35 schematically illustrates a soft endoscope in which an embodiment of the focusing detecting device of the invention is incorporated;

FIG. 36 schematically illustrates a modified aperture for focusing detection in a photoelectric element; and FIG. 37 illustrates a cross-sectional view of a further modified aperture shape in accordance with the invention.

DETAILED DESCRIPTION OF THE INVENTION

Referring to FIG. 1, a camera adapter 5, e.g. an adapter for photographing (device), is removably fitted to the rear end side of an eyepiece part 3 of an endoscope 4. As indicated, the endoscope 4 is formed of an elongated inserted part 1 having an objective optical system arranged and contained on the tip side and the eyepiece part 3 which is connected on the tip side to the hand side end part of the inserted part 1. The eyepiece part 3 has a light guiding mouthpiece part 2 on the side containing an eyepiece optical system. A camera (body) 6 or television camera as a photographing device can be removably fitted to the rear end side of the camera adapter 5.

A focusing setting device whereby a photographing lens is automatically moved and set in a focusing position is contained in the camera adapter 5.

In addition, a focusing detecting device is contained in the camera adapter 5. This detecting device includes an optical system defining an optical axis 7 in which a movable photographing lens 8 is mounted. The photographing lens 8 is movable forward and rearward as indicated by the arrows (on the optical axis 7) and is arranged in a rear position opposed to the eyepiece lens system of the endoscope 4 in case the endoscope 4 is fitted. In addition, a focusing mirror 9 formed of a translucent mirror is arranged on an incline (for example, by 45 degrees) on the optical axis 7 to the rear of the photographing lens 8. An image re-forming lens 10, a light receiving means such as a photoelectric element 11 and a light projecting means such as a focusing light source 12 are arranged in turn on a reflected optical axis on which the light projected along optical axis 7 is reflected by the focusing mirror 9. A lamp lens 13 and focusing indicating lamp 14 indicating focusing are arranged in turn on the reflected optical axis (in the lower position in FIG. 1) on the back side of the focusing mirror 9.

Figure 2:
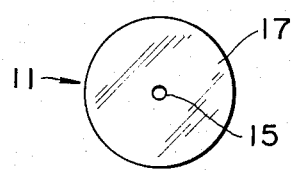
FIG. 2 is an elevation showing a photoelectric element provided with a pihhole.
Figure 3:
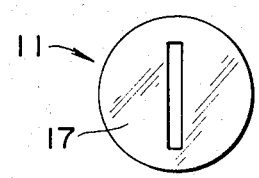
FIG. 3 is an elevation showing a photoelectric element with a rectangular slit.

The photoelectric element 11 is in the form of a disk (needless to say, may be of a square or rectangle) provided with an aperture such as a pinhole 15 (or a rectangular slit as shown in FIG. 3) in the central part as shown in FIG. 2. A photoelectric (converting) surface 17 of a light sensitive element is formed on the front surface of the disk and, has varying current characteristics with the light as, for example, a photodiode or phototransistor. The element 11 functions to produce a photoelectric motive force as a solar battery or varies the resistance value as CDS. A light intercepting surface 18 is formed on the back side of the disk so that the photoelectric element 11 may not be sensitive directly to the light of the focusing light source 12 which is a light source for detecting focusing in the rear position of the pinhole 15.

A return mirror 21 inclined (for example, by 45 degrees) is arranged on the optical axis 7 to the rear of the focusing mirror 9 in the camera 6 fitted to the rear of the camera adapter 5. A photographing film 22 is arranged in a predetermined image forming position further in the rear of the camera 6.

A pentaprism 23 for turning the image laterally back to the erect image is arranged on the reflected optical axis (upper in the illustration) of the return mirror 21 and a finder lens 24 is arranged on the optical axis through this pentaprism 23 so that the same optical image as is formed on the film 22 can be observed with the eye brought close to the rear of the finder lens 24. In the case of photographing, the return mirror 21 will retreat so that the incident light will form an image on the film surface.

The position of the photoelectric surface 17 of the photoelectric element 11 is so arranged as to be optically conjugate with the position of the film 22 surface. That is, the light path length for the light passing through the photographing lens 8 to form an image on the film 22 surface and the light path length for the light reflected by the focusing mirror 9 to form an image on the photoelectric surface 17 of the photoelectric element 11 through the image re-forming lens 10 are so set as to be equal to each other.

The principle of the focusing detecting function in the camera adapter 5 containing the focusing setting device shall be first explained with reference to FIG. 4 in which the optical system is simplified to a linear optical system. Then, the operations of the focusing detecting device and focusing setting device shall be explained. In FIG. 4, the light of the focusing light source 12 will proceed along the optical axis 7 through the pinhole 15 of the photoelectric element 11 and will be projected on the spot toward the object to be photographed 25 through the photographing lens 8. The light projected and reflected by the object to be photographed will return to the photoelectric element 11 side again through the photographing lens 8. Now, when the object to be photographed 25 is in the position indicated by the reference symbol b, the focusing shall be made and the positions in case the object to be photographed is too near and too far than it shall be indicated respectively by the reference symbols a and c. (The reference symbols a and c correspond respectively to the front focus and rear focus.)

In the above mentioned case, the projected light image will be pinhole-shaped in the position of the reference symbol b. The light reflected in this position will become a convergent point (image forming point) and therefore no light will reach the photoelectric surface 17 around this pinhole 15. On the other hand, the light projected on the spot in the position of the reference symbol a will expand and the light reflected in this position will have a rear position of the pinhole 15 as a convergent point and will therefore reach the photoelectric surface 17 on the outer periphery of the pinhole 15 and a signal for this light will be put out. In the same manner, the light reflected in the position of the reference symbol c will already form a convergent point in the front position of the pinhole 15, will then expand and will reach the photoelectric surface 17 and a signal for the light will be put out of the photoelectric element.

In the above description, only the light for the focusing light source 12 has been considered. However, in fact, not only the above mentioned light but also such external light as by an illuminating light through a light guide, for example, in an endoscope will be incident. Therefore, the output signal of the photoelectric element 11 will be bulked by the output level by the above described external light as shown in FIG. 5 in which the abscissa represents the positions of the object to be photographed and the ordinate represents examples of detecting output levels of the photoelectric element 11.

That is to say, when the object to be photographed 25 is in the focusing position, that is, the position of the reference symbol b, the output level Pb of the photoelectric element 11 will be minimum and, even if it is too near and too far than that, the respective signal output levels Pa and Pc will be larger.

Thus, the position in which the signal output is minimum will be a focusing position. Therefore, the position of the photographing lens 8 in which the output of the photoelectric element 11 is made minimum by moving the photographing lens 8 with respect to the object 25 at any distance will be a focusing position. Therefore, if such photographing as by a camera is made in this position, a clear photographing (photograph) will be able to be made. In case this photographing lens 8 is moved, the direction in which the output level becomes smaller will be shown to approach the focusing position before the photographing lens is moved. Therefore, the photographing lens 8 may be manually or automatically moved in this direction. In the case of automatically setting the focusing, if the movement is stopped at a point where the output level begins to become larger or to vary no more with the movement of the photographing lens 8, the photographing lens 8 will be able to be set in the focusing position for the object 25 at any distance.

The above described principle can be applied exactly the same even to the optical system within the camera shown in FIG. 1 except that the image re-forming lens 10 and focusing (detecting) mirror 9 are arranged on the way to the photoelectric element 11 in the rear of the photographing lens 8 and that the endoscope 4 is arranged on the way to the object 25 in front of the photographing lens 8.

In the camera adapter 5 shown in FIG. 1, in case focusing is made, a focusing indicating lamp 14 will light as described later. This light will be condensed by a lamp lens 13, will be reflected by the return mirror 9, will proceed rearward of the optical axis 7 and will be incident upon the eye of the observer through the return mirror 21, pentaprism 23 and finder lens 24. Therefore, if photographing is made in case the focusing indicating lamp 14 lights, a clear photographing (photograph) will be able to be made.

If an infrared light source having light emitting characteristics in an infrared range is used for the focusing light source 12 and an element showing favorable detecting characteristics in an infrared range is used for the photoelectric element 11, the influences of the illuminating light for the general observation and other external lights incident upon the photoelectric element 11 will reduce as shown in FIG. 6 and the detecting capacity and setting capacity for the focusing position will improve. That is to say, when the above mentioned light source and photoelectric element are used, the output level characteristics of the photoelectric element for the position of the object to be photographed 25 will improve in the signal-to-noise ratio (SN ratio) being higher than in FIG. 5. In other words, the output levels Pa' and Pc' respectively in the displaced positions indicated by the reference symbols a and c against the output level Pb' in the focusing position indicated by the reference symbol b will be relatively smaller than in the above described case and the amount of variation of the output level for the displaced position, for example, of a from the focusing position will be Pa'/Pb' and will be larger than the amount of variation Pa/Pb in the above described case.

FIG. 7 shows a focusing setting device wherein the photographing lens 8 is automatically moved and set in the focusing position by using the focusing detecting device and an automatically exposing device using an electric circuit block.

That is to say, this focusing setting device 31 comprises a light emitting circuit 33 which makes a focusing lamp 32 (corresponding to the focusing light source 12) emit a light and projects the light onto the object to be photographed 25, a focusing detecting circuit 34 which amplifies the signal output having detected the reflected light from the object 25 and detects whether focusing is made or not, an indicator 35 (corresponding to the above mentioned focusing indicating lamp 14) indicating the time of focusing and a (photographing lens) driving device 36 which moves the photographing lens 8 in order to set it in the focusing position.

The light emitting circuit 33 is so formed that, for example, when a release button 37 is pushed, a switch SW1 will be turned on (meanwhile a switch SW2 will be also kept on) to light such focusing lamp 32 as LED. The focusing detecting circuit 34 comprises an amplifier 39 amplifying the output signal of the photoelectric element 11 and a comparing detecting circuit 40. This comparing detecting circuit 40 is so formed that, for example, in case the driving device 36 moves the photographing lens 4 forward and rearward at a fixed velocity, detecting signals (amplified by the amplifier 39) will be put in in turn at proper intervals, in such case, the signal value put in before and the signal value put in following it will be compared with each other. When the signal put in later becomes equal to or larger than the signal put in before, a sensing signal will be put out to stop the driving device 36 and move the photographing lens 8 in the reverse direction. When the sensing signal is set at a proper time constant and is integrated and the integrated output is above a fixed value or when the number of sensing signals at fixed intervals is counted and the value is above a fixed value, the indicator 35 will be lighted and the operation of the driving device 36 will be stopped.

On the other hand, when the release button is further strongly pushed, a third switch SW3 will be turned on (the second switch SW2 will be off and the focusing setting device 31 will not operate) to operate the below described automatically exposing (EE) device 41.

The EE device 41 comprises an amplifier wherein, when the switch SW3 is set on, an electric power will be fed from a current source 42 to amplify the detecting signal of a light measuring photoelectric element 43 and an EE controlling circuit 47 which controls respectively the shutter speed of an EE shutter 45 and a light amount controlling circuit 46 controlling the light amount of the photographing light source (the photographing illuminating light source in an endoscope) by this amplified signal. Thus, when the switch SW3 is set on, the EE controlling circuit 47 will operate to adjust the shutter speed and light amount to be proper.

In the focusing setting device 31 formed as mentioned above, the photographing lens 8 will be moved and set in the focusing position by the below described operation.

When when the release button 37 is pushed with a finger or the like to set the switch SW1 on, the light emitting circuit 33 will light the focusing lamp 32, the light will pass through the pinhole 15 (see FIG. 1), will further pass through the image re-forming lens 10, will be reflected by the focusing mirror 9 and will be projected onto the object 25 through the photographing lens 8. The light reflected by the object 25 will again pass through the photographing lens 8, will be reflected by the focusing mirror 9 and will proceed to the photoelectric element 11 provided with the pinhole 15. If the photographing lens 8 is in the focusing position for the object 25, the output level of the photoelectric element 11 will be minimum. Therefore, in this case, in case the driving device 36 moves the photographing lens 8, for example, forward, the output level will be large. Therefore, the advancing operation should be immediately stopped. The comparing detecting circuit 40 will put out a sensing signal and the driving device 36 will move the photographing lens 8 in the reverse direction. Even in this case, the output level will become large, therefore the sensing signal will be put out. The operation of moving this photographing lens 8 rearward will be stopped and the photographing lens 8 will be moved in the reverse direction (that is, forward). Thus, the photographing lens 8 will slightly vibrate on the optical axis 7. In this case, the sensing signal will be put out of the comparing detecting circuit 40 and therefore, if it is passed through an integrating circuit or counting circuit having a proper time constant, the output will be above a fixed value and the slight vibrating operation will stop.

On the other hand, in case the photographing lens 8 is displaced from the focusing position, if the driving device 36 moves the photographing lens 8 in the direction reverse to the focusing position, the output level of the photoelectric element 11 will (gradually) become larger. Therefore, the comparing detecting circuit 40 will control the driving device 36 to move the photographing lens 8 in the reverse direction the same as is described above. When the photographing lens 8 passes through the focusing position, the same slight vibrating operation as is described above will be repeated and the photographing lens 8 will be set in the focusing position.

When the photographing lens 8 is thus set in the focusing position, such indicator 35 as the focusing indicating lamp 14 will light. Therefore, when the observer sights it and further strongly pushes the release button 37, the EE device 41 will operate and photographing (photograph) will be made. In this case, the EE device 41 can be operated simultaneously as operatively connected or continuously. Also, the indicator 35 may be made to operate a buzzer or the like instead of lighting the lamp.

In the above described embodiment, the focusing detecting device and focusing setting device are provided in the camera adapter 5 (of a camera or television camera) fitted to the endoscope 4. However, needless to say, the present invention is not limited to this embodiment but can be applied to such optical instruments or optical devices in which whether focusing clearly forming an image on a predetermined image forming surface by moving a lens is made or not is important as ordinary cameras. In this case, the photographing lens means a part or all of the lenses used for forming images in optical instruments (or devices) and may be moved forward and rearward along the optical axis.

In the above described embodiment, the focusing detecting light is projected toward the object to be photographed 25 through the small aperture by the pinhole 15 or the slit-shaped narrow aperture formed in the photoelectric element 11, the spot light projecting means and light receiving and focusing detecting means are efficiently used so that the projected light reflected by the object 25 will be received by the photoelectric element 11 having the aperture formed to detect focusing and therefore there are advantages that the focusing detecting device can be contained in a small space and can be realized with a simple structure at a low cost.

Also, the focusing detecting device has a light projecting means so that, by adjusting the light amount, it can be used for a dark object to be photographed or in a dark photographing optical system. A photographing light path is almost commonly used (need not be commonly used). Therefore, the focusing detecting device can be applied to such optical devices e.g., an endoscope as have very little space other than for a unit photographing optical system.

Referring to FIG. 8 wherein like reference characters indicate like parts as above, the light projecting means and light receiving means may be constructed in alternative manners. As shown, a beam splitter (which may be a translucent mirror) formed by joining right prisms 51A and 51B is arranged in the rear of the image reforming lens 10 on the reflected optical axis. Light intercepting plates 53A and 53B respectively having apertures 52A and 52B are bonded to the respective prisms surfaces in the rear on the respective optical axes divided by the respective right prisms 51A and 51B. A photoelectric element 54 and focusing light source 12 are arranged to the rear of the respective apertures 52A and 52B formed on the respective optical axes.

The pinhole-shaped apertures 52A and 52B are formed as shown respectively in FIGS. 9(a) and (b) with the optical axes passing through or reflected by the prisms 51A and 51B as centers respectively in the light intercepting plates 53A and 53B respectively on the sides of the photoelectric elements 54 and light source 12. The light passing through this aperture 52B, reflected by the jointing part of the prisms 51B and 51A, further reflected by the focusing mirror 9, passing through the photographing lens 8 and projected on the spot on the object 25 side will be reflected by the focusing mirror 9, will pass through the prisms 51B and 51A and through the aperture 52A and will be incident upon the photoelectric element 54.

The position of the aperture 52A provided on the front surface of the photoelectric element 54 is so arranged as to be optically conjugate with the position of the above mentioned film 22 surface. That is, the light path length for the light passing through the photographing lens 8 to form an image on the film 22 surface and the light path length for the light reflected by the focusing mirror 9 and passing through the image reforming lens 10 to form an image in the position of the aperture 52A are set to be equal to each other.

The principle of the focusing detection by the focusing detecting device having the thus arranged optical system shall be explained with reference to FIG. 10 simplified to be of a linear optical system.

In FIG. 10, the light of the focusing light source 12 will pass through the pinhole-shaped aperture 52B of the light intercepting plate 53B, will be reflected by the jointing surface of the prisms 51B and 51A, will proceed along the optical axis 7, will pass through the photographing lens 8 and will be projected on the spot toward the object 25 in the front. The projected light reflected by the object to be photographed 25 will again pass through the photographing lens 8 and will return to the photoelectric element 54 side. Now, it is assumed that, when the object to be photographed 25 is in the position indicated by the reference symbol b, focusing will be made. The positions nearer and farther than that shall be indicated respectively by the reference symbols a and c.

The light reflected in the position b will pass through the photographing lens 8 and further through the prisms 51B and 51A, the position of the pinhole-shaped aperture 52A will become a convergent point (image forming point) and therefore substantially all the reflected light will pass through this pinhole-shaped aperture 52A to reach the photoelectric surface of the photoelectric element 54 in the rear. Therefore, in this case, the output level Pb of the photoelectric element 54 will be maximum.

On the other hand, as the position in the rear of the pinhole-shaped aperture 52A becomes a convergent point, the light reflected in the position a will be substantially intercepted by the light intercepting plate 53A around the aperture 52A in front of the convergent point and will only slightly reach the photoelectric element 54 and therefore its output level Pa will become small.

In the same manner, the light reflected in the position c will reach a convergent point already in front of the pinhole, will then expand and will therefore only slightly reach the photoelectric element 54 and therefore, in this case, the output level Pc of the photoelectric element 54 will be also small.

Of the output levels Pa, Pb and Pc of the photoelectric element 54 for the respective positions a, b and c of the object to be photographed, when the object 25 is in the focusing position for the photographing lens 8 or when the photographing lens 8 is in the focusing position for the object 25, the output level Pb of the photoelectric element 54 will be of the maximum value.

In the above description, only the light for the focusing light source 12 has been considered. However, in fact, not only the above mentioned light but also such external light deviated from the optical axis 7 as by an illuminating light through a light guide, for example, in the endoscope 4 will be incident and therefore the output level of the photoelectric element 54 will be bulked by the output level by the above described external light as shown in FIG. 11.

If an infrared light source having light emitting characteristics in an infrared range is used for the above described focusing light source 12 and an element showing favorable detecting characteristics in an infrared range is used for the photoelectric element 54, the influences of the illuminating light for the general observation and other external lights incident upon the photoelectric element 54 will reduce as shown in FIG. 12 and the detecting capacity and setting capacity for the focusing position will improve. That is to say, when the above mentioned light source and photoelectric element are used, the output level characteristics of the photoelectric element for the position of the object to be photographed 25 will improve in the signal-to-noise ratio (SN ratio) to be higher than in FIG. 11.

In this embodiment, the shapes of the apertures 52B and 52A respectively on the sides 12 and photoelectric element 54 (light detection) are not limited to be pinhole-shaped as shown in FIG. 9 but one or both of them can be rectangular hole-shaped or slit-shaped.

In this second embodiment, such apertures 52A and 52B as are pinhole-shaped are formed respectively in the light intercepting plates 53A and 53B and there is a feature that the manufacture is easier than in the case of forming an aperture directly in the photoelectric element. In this second embodiment, the means of automatically setting the photographing lens 8 in the focusing state can be formed substantially in the same manner as is described above but the minimum value corresponds to the maximum value. Even in the later described other embodiments, unless specifically referred to, it can be formed substantially in the same manner.

FIG. 13 shows the third embodiment in which the apertures in the light projecting and receiving means for focusing detection are made plural.

That is to say, a light receiving means having an elongated photoelectric surface 17' and having a light intercepting surface 18A around slit-shaped apertures 55 formed on both sides of the photoelectric surface 17' and around the photoelectric surface 17' as shown in FIG. 14 is arranged in the rear (upper in the illustration) of the image reforming lens 10 on the reflected optical axis of the focusing mirror 9. The branched emitting end surfaces of a light guide 56 are arranged so as to be positioned respectively in the rear of the slit-shaped apertures and the light projecting means it so formed that the illuminating light of an external focusing light source 12' fed to the other end surface of this light guide 56 may be projected on the spot onto the object 25 side through the apertures 55.

The apertures 55 or photoelectric surface 17' is arranged in a position optically conjugate with the film 22 and a light intercepting plate (layer) 18 is formed on the back surface side of the photoelectric surface 17' so that the illuminating light from the end surface of the light guide 56 may not be directly incident.

The other parts than are mentioned above are of the same formation as is described above.

The focusing detecting function in this third embodiment shall be explained on the basis of FIG. 15.

As shown in FIG. 15, the illuminating light for focusing detection emitted from the end surface of the light guide 56 will pass through the slit-shaped apertures 55 in the front, will further pass through the photographing lens 8 and will be projected toward the object to be photographed 25.

As described above, when the object to be photographed 25 is in the position b with respect to the photographing lens 8, focusing will be made and the positions nearer and farther than this position are indicated respectively by the reference symbols a and c.

In the above mentioned case, for example, as illustrated, the light emitted from one aperture 55 (on the optical axis 7) and reflected in the position shown by the reference symbol b will pass through the photographing lens 8, will have a convergent point (image forming point) in the position of the aperture 55 and therefore will not reach the photoelectric surface 17' adjacent to this aperture 55.

On the other hand, the light reflected in the position of the reference symbol a will have a convergent point in the position in the rear of the aperture 55 and will therefore reach the photoelectric surface 17' adjacent to the aperture 55 as illustrated and a signal for this light will be put out. In the same manner, the light reflected in the position of the reference symbol c will already have a convergent point in the position in front of the aperture 55, will then expand and will reach the photoelectric surface 17' and a signal for this light will be put out.

In the above description, the case that the light is emitted from one aperture 55 has been described but the case of the other aperture 55 is the same.

That is to say, the illuminating lights will be projected toward the object 25 through both apertures 55 and will be received on the photoelectric surface 17', therefore the light deviated from the focusing will be superposed and detected on the photoelectric surface 17' and the photoelectric surface 17' will function more effectively than in the case that it is provided only on the optical axis 7. By the way, in FIG. 14 or 15, the photoelectric surface 17' is formed only inside both apertures 55 but, when the photoelectric surface 17' is formed on the light intercepting surface 18A outside both apertures 55, the incident light amount (only) at the time of non-focusing will be able to be increased and the focusing detecting sensitivity and SN ratio will be able to be improved.

FIG. 16 shows the fourth embodiment wherein a focusing detecting light projecting means (and receiving means) directly projects the light from a light source 12 such as a high brightness light emitting diode lamp from the rear of the apertures 55. In this case, the brightness of the lights emitted from the respective apertures 55 by the light source 12 will be likely to fluctuate. However, when a glass plate 57 is bonded to the back surface sides of the light intercepting surfaces 18 and 18A as illustrated and such light dispersing surface as of frosted glass is formed on one surface opposed to the light source 12 of the glass plate 57, the above brightness fluctuation will be able to be substantially dissolved. In this case, the position of the aperture 55 or photo electric surface 17' is arranged in the position optically conjugage with the film 22 as described above.

Even in FIG. 16, if the photoelectric surface 17' is formed not only inside both apertures 55 but also outside the light intercepting surfaces 18A, the focusing detecting sensitivity and SN ratio will be able to be improved to be higher.

Figure 17B:
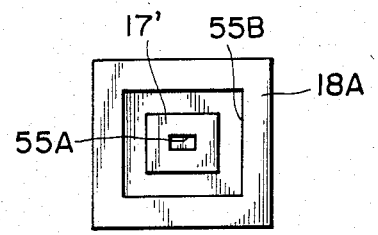

FIG. 17 shows the fifth embodiment in which the light receiving means in FIG. 14 is improved.

As shown in FIG. 17, a photoelectric surface 17' is provided in the form of a band so as to enclose the outer periphery of a rectangular (or square) aperture 55A, an aperture 55B is further formed in the form of a band so as to enclose the outer periphery of the photoelectric surface 17' and a light intercepting surface 18A (or, if a photoelectric surface is further formed, it will be effective) is formed on the outer periphery of this aperture 55B. A light intercepting surface 18 is formed on the back surface side of the photoelectric surface 17', further a glass plate 57 is bonded to the back surface of the light intercepting surface 18 and the back surface of the light intercepting surface 18A and a light dispersing surface is formed on the surface opposed to the light source 12 of this glass plate 57. In this case, too, the position of the apertures 55A and 55B or the photoelectric surface 17' is arranged in the position optically conjugate with such image forming surface as of the film 22.

In case this embodiment is used, the projected light amount for focusing detection will be able to be considerably increased, the area of the photoelectric surface 17' will be made wider, the light amount in the case of nonfocusing will be superposed so as to be able to be effectively detected and therefore the focusing detecting sensitivity and SN ratio will be able to be further improved to be higher than in the above described embodiment.

In the above mentioned third to fifth embodiments, the respective apertures 55, 55A and 55B may be such optical apertures or light passing parts through which the light passes and can be therefore formed of transparent glass or the like. Also, the shapes of the (optical) apertures 55, 55A and 55B are not limited to those illustrated. For example, in FIG. 17, the photoelectric surface 17' or apertures 55A and 55B can be formed to be concentrically annular.

FIG. 18 shows the sixth embodiment wherein the light projecting and receiving means for focusing detection arranged and contained within the camera adapter 5 in the first embodiment are contained in the camera (body) 6 side.

That is to say, the illuminating light led to the light guiding mouthpiece part 2 of the endoscope 4 through a light guiding cable 62 from an illuminating light source 61 will pass through the light guide within the inserted part 1 and will be projected onto the object 25 side from the tip side of the inserted part 1. The light reflected by the illuminated object to be photographed 25 will pass through the photographing lens 8 contained within the camera adapter 5 fitted to the eyepiece part 63 of the endoscope 4, will thence proceed to the rear of the optical axis 7 of the optical system and will be incident upon the camera 6 side fitted in the rear of the camera adapter 5.

A return mirror 21' having a reflecting surface inclined by a predetermined angle (for example, 45 degrees) with the incident light on the optical axis 7 within the camera body 6 in the rear of the photographing lens 8, passing a part of the light rearward and retreating such as by rotating from the position shown in FIG. 18 at the time of photographing and a focusing detecting mirror 64 fitted to this return mirror 21' and having a reflecting surface vertical to the reflecting surface of the return mirror 21' are arranged and further a photographing film 22 is arranged in the rear at a predetermined distance on the optical axis.

The return mirror 21' is so formed as to reflect the incident light and to pass a part of the incident light to the focusing mirror 64 side positioned on the optical axis 7 slightly in the rear (in this case, the light will not pass to the film 22 side in the rear of the focusing mirror 64). A focusing detecting photoelectric element 11 having a vertical light receiving surface on the optical axis of the light reflected by this focusing mirror 64 (on the lower side in the drawing) is arranged. This photoelectric element 11 is arranged in the position conjugate with the optical distance (light path length) forming an image on the film 22 surface for the incident light from the object 25 in front of the inserted part 1, has such aperture 5 as is pinhole-shaped formed in the central part of the photoelectric surface 17 on the front surface as in the first embodiment and has a light intercepting surface 18 formed on the back surface so that the light of the light source 12 for focusing detection (spot illumination) may not directly reach the photoelectric surface 17.

FIG. 19 shows the seventh embodiment wherein the focusing detecting means explained in the second embodiment is contained within the camera 6 and the light projecting and receiving means are formed as follows.

That is to say, a beam splitter formed by joining right prisms 51A and 51B is arranged in the rear of the optical axis reflected by the focusing mirror 64 (lower in the illustration).

Light intercepting plates 53A and 53B are bonded so that such apertures 52A and 52B as are pinhole-shaped may be positioned respectively on the rear end surfaces of the above mentioned respective right prisms 51A and 51B in the rear on the optical axis passing through the jointing surface of these right prisms 51A and 51B and on the reflected optical axis and a photoelectric element 54 and the spot illuminating light source 12 are arranged respectively in the rear of the respective apertures 52A and 52B such as are pinhole-shaped.

The aperture 52A such as is pinhole-shaped on the front surface of the photoelectric element 54 is so set as to be in the position optically conjugate with the position of the film 22.

The principle of focus detection in this embodiment is substantially the same as in the second embodiment. It is also possible in the same manner to contain the third to fifth embodiments in the camera 6 side (not illustrated).

In the above described respective embodiments, whether the photographing optical system is in a focusing state in which the image of the object to be photographed 25 is clearly formed on the predetermined image forming surface or not is detected and the photographing lens 8 within the camera adapter 5 is moved to automatically set the focusing state but, as shown in FIGS. 20 to 23, the focusing means provided in the eyepiece part of the endoscope may be so formed as to be adjustable.

That is to say, in the eighth embodiment shown in FIG. 20, the camera adapter 5 and the optical system of the camera 6 are arranged in the same manner as in the first embodiment shown in FIG. 1.

A driving motor 71 as the driving device 36 controlled by the signal output of the focusing detecting circuit 34 described in the first embodiment is arranged within the camera adapter 5 and a gear 72 is fitted to the tip of the shaft of the motor 71 and is so formed as to mesh with (the meshing part of) a focusing ring 73 formed on the outer periphery of the endoscope eyepiece part 63 in case the camera adapter 5 is fitted to the endoscope 4.

When the focusing ring 73 is rotated, an eyepiece 74 contained within the eyepiece part 63 will move forward and rearward as shown by the arrow A along the optical axis 7 together with an eyepiece frame not illustrated and a clear optical image will be able to be formed on the film surface.

That is to say, when the driving motor 71 rotates, the focusing ring 73 meshing with the gear 72 will be rotated, the eyepiece 74 will be moved forward or rearward, the output levels by the focusing detecting circuit 34 (See FIG. 7) will be compared before and after the respective movements, for example, at predetermined intervals, the rotating direction of the driving motor 71 will be controlled by these compared outputs so as to move the eyepiece 74 in the direction in which the output level will gradually become smaller and the rotation of the driving motor 71 will be stopped in the position in which the output level will become minimum as described above to set the photographing optical system in the focusing state for the object 25 at any distance.

FIG. 21 shows the ninth embodiment wherein the light projecting means and light receiving means for focusing detection are contained in the camera 6 side.

In this case, the detecting signal by the photoelectric element 11 within the camera 6 will be transmitted to the camera adapter 5 by the connection of a connector receiver and connector 75B to control the driving motor 71.

FIG. 22 shows the tenth embodiment wherein what are described in the second embodiment shown in FIG. 8 are used for the light projecting means and light receiving means for focusing detection shown in FIG. 20.

In this case, the driving motor 71 will be controlled so that the detecting level of the photoelectric element 54 will not be minimum but will be maximum to set the photographing optical system in the focusing state.

By the way, it is evident that the above mentioned light projecting means and light receiving means can be contained in the camera 6 side.

Also, the driving motor 71 need not be contained in the camera adapter 5 side but can be contained in the camera 6 side, for example, as in the eleventh embodiment shown in FIG. 23.

That is to say, in the eleventh embodiment shown in FIG. 23, the motor 71 is contained in the camera 6 side and is so formed as to be controlled by the signal of the focusing detecting circuit 34 (see FIG. 7) in which focusing is detected by measuring the light amount received by the light receiving means. The rotary shaft of this motor 71 is so formed that, in case the camera 6 and camera adapter 5 are fitted, the rotary shaft will be connected with a shaft 76 inserted through the camera adapter 5, for example, having a clicking groove formed and the rotation of the motor 71 will be transmitted to a gear 72 attached to the tip of the shaft 76. The operation of this embodiment is substantially the same as of the above described ninth embodiment.

By the way, it is needless to say that the light projecting means and light receiving means can be contained in the camera 6 side and the light projecting means and light receiving means of the second embodiment different from the above can be used in FIG. 23.

In the above mentioned FIGS. 20 to 23, the eyepiece 74 forming the observing optical system is movable. However, it is evident that, in case the objective optical system side is movable or a relay lens system is used for the image transmitting means, even in case at least a part of the relay lens system is movable, the present invention will be able to be applied.

Further, the focus adjusting means of the endoscope 4 can be formed not only by the rotation of the focusing ring 73 but also by using a rack and pinion so that the focus of the observing optical system may be variable and the means may be driven by the driving device.

FIG. 24 shows the twelfth embodiment wherein two of the light projecting and receiving means for focusing detection described in the first embodiment are used.

That is to say, the same photoelectric elements 11A and 11B as the photoelectric element 11 described in the first embodiment are arranged on both sides adjacent to the optical axis 7' in the rear of the image re-forming lens 10 arranged in the rear on the optical axis 7' reflected by the focusing mirror 9. Light projecting light sources 12A and 12B for focusing detection are arranged respectively just after the apertures 15A and 15B such as are pinholeshaped of the respective photoelectric elements 11A and 11B.

Further, light intercepting surfaces 18A and 18B are formed on the back surface sides of the respective photoelectric elements 11A and 11B so that the lights of the above mentioned light projecting light sources 12A and 12B may not directly reach the respective photoelectric surfaces 17A and 17B on the front surfaces of the respective photoelectric elements 11A and 11B.

The photoelectric elements 11A and 11B are arranged in front and rear of the position or plane 81 optically conjugate with the film surface 22 arranged in a predetermined image forming position. That is to say, the position substantially intermediate between the respective photoelectric surfaces 17A and 17B of both photoelectric elements 11A and 11B is made the position 81 optically conjugate with the position of the above mentioned image forming surface (of the film 22).

Therefore, the light path length of the lights emitted from the respective light sources 12A and 12B through the photographing lens 8 and reflected by the object to be photographed 25 to form an image on the film 22 surface and the light path length of the lights reflected by the focusing mirror 9, through the image reforming lens 10 to the respective photoelectric surfaces 17A and 17B of the photoelectric elements 11A and 11B are so set as to be equal to each other.

The principle of focusing detection in the thus arranged optical system shall be explained with reference to FIG. 25.

In FIG. 25, the lights passing through the respective apertures 15A and 15B and through the photographing optical system and projected onto the object to be photographed 25 will be partly reflected by the object 25, will again pass through the photographing optical system and will return to the respective photoelectric elements 11A and 11B. In this case, if the photographing optical system is in the focusing position for the object 25 in the position of the reference symbol b, the image forming points (convergent points) of the respective incident lights will be in the intermediate position 81 and therefore the outputs of the photoelectric elements 11A and 11B arranged at substantially equal distances in through the linear groove 118 and is arranged so as to be contained at the tip in the spiral groove 114.

A focusing means of the objective optical system is so formed that, when the focusing ring 73 is rotated and the ring-shaped member 119 having the cam pin 117 provided to project moves forward and rearward along the optical axis within the range of the linear groove, an objective 104' arranged on the tip side of the inserted part 101 through such transmitting means as a wire will be operatively connected to move forward and rearward along the optical axis 7.

That is to say, when the focusing ring 73 is rotated, the ring-shaped member 115 having the spiral groove 114 formed inside will rotate together, the cam pin 117 contained on the tip side in this spiral groove 114 and formed so as to pass through the linear groove 118 will move forward or rearward according to the rotating direction through the linear groove 118 and the objective 104' will move through the ring-shaped member 119 with the cam pin 117 and such transmitting member as a wire.

Further, the rotating position by the focusing ring 73 is in a proper position, that is, the position of forming the optical image of the object to be photographed in the objective optical system 104 is in the position of the objective surface 105 of the image guiding fibers 106 so that the image will be formed also in the position of the aperture 15' conjugate with the position of the above mentioned objective surface 105 on the optical axis 7' reflected and divided by the beam splitting means 107. When the image is formed in this position, the focusing state will be judged by the focusing detecting circuit 34 and the lamp 14 will light.

By the way, the beam splitting means 107 and 110 may be formed of translucent mirrors.

In the above described many embodiments, in case the light is projected from such aperture as is pinhole-shaped formed in the photoelectric element (such as of the reference numeral 11) and is received on the peripheral photoelectric surface 17, the light of the light source (lamp) 12 may be projected directly from the aperture but, if the light projecting and receiving means forming an aperture (through hole) of such shape as is shown in FIG. 36 is used, focusing will be able to be detected at a higher precision.

That is to say, a thin P (-type semiconductor) layer 121 is not made an etching surface as in ordinary etching but a base plate side N (-type semiconductor) layer 122 (back surface) side is made an etching (corroding) surface and has such through hole 23 as a pinhole or slit formed in it.

A light intercepting plate 124 provided with a hole communicating with the through hole 123 is pasted to the back surface of the N layer 122 to form a photoelectric element 11' and fibers 125 are fixed with a sealing member 126 or the like so as to be passed at one end to be an emitting side into the through hole 123. These fibers 125 are so formed at the other incident end that the light of the light source lamp 12' will be condensed and emitted by a condenser lens 127 and will be projected on the spot to the object 25 side through the front photographing lens 8 or the like from the above mentioned emitting side end.

By the way, in the photoelectric element 11' in which the through hole 123 is formed, the peripheral wall surface at the front end of the through hole 123 is thinly covered with the N layer 122 so that the illuminating light may not directly reach (the P layer 121 forming) the photoelectric surface.

A battery 128 and resistance 129 are connected in series so as to bias the PN jointing surface in the reverse direction between the P layer 121 and N layer 122 of the photoelectric element 11' so that, when the light is incident upon the photoelectric surface, that is, the P layer 121, the electric current flowing through the PN jointing surface will vary in response to the light amount and the current variation will be able to be detected as a voltage variation from the output ends at both ends of the resistance 129.

By the way, the reference numeral 130 denotes a light intercepting plate for preventing an unnecessary light from being incident.

In the through hole 123, as the N layer 122 side is formed as an etching surface, as illustrated, the diameter or width 123a of the through hole 123 on the photoelectric surface side, that is, the P layer 121 side will be smaller than the diameter or width 123b on the side reverse to the photoelectric surface, that is, the N layer 122 side. Therefore, the diameter or width 123a of the through hole 123 on the photoelectric surface side can be kept to be such diameter or width (required for light projection) as of the bundle of the fibers 125 and focusing can be detected at a precision higher than of the through hole expanded on the photoelectric surface side by the ordinary etching treatment as shown by the broken lines B.

In the optical system arranged as mentioned above, when the object 25 to be photographed is in the position indicated by the reference symbol b, focusing will be made and, in case the through hole expands on the photoelectric surface side as shown by the broken lines B for the object 25 in the position b' slightly displaced rearward from the position b, the same as in the case of the reference symbol b, the light will not reach the photoelectric surface, therefore the outputs at both ends of the resistance 129 will be the output voltage levels by the time current and a focusing state will be judged to be made. However, in the case of the through hole 123 shown by the solid lines, in the case of the reference symbol b, the light will reach the photoelectric surface and non-focusing will be able to be distinguished. That is to say, whether focusing is made or not can be detected at a high precision.

By the way, the through hole 123 is formed not only by etching but also can be made by drilling from the back surface side with a drill having a tapered blade.

On the other hand, a photoelectric element 11" can be also formed by providing through holes 123' of the same shape on both photoelectric surface side and back surface side as shown in FIG. 37 by machining using a drill or the like.

Even in this case, if the P layer 121 to be a photoelectric surface is adjacent directly to the front end peripheral edge of the through hole 123', in case the illuminating light passes, the light current will directly flow and the light amount by the reflected light from the object 25 to be photographed will be difficult to accurately measure. Therefore, the peripheral wall surface of the through hole 123' is covered, for example, with the N layer which is not a photoelectric surface. In this case, such light intercepting means as fitting a coating material or thin pipe to the photoelectric surface or P layer 121 and N layer 122 parts of the part exposed to the through hole 123' may be taken.

In the above description, the respective photoelectric surfaces of the photoelectric elements 11' are made P layer sides in the PN jointing. However, it is evident that, if the polarity of the impressed voltage is varied, the N layer side will be able to be made a photoelectric surface.

It is also evident that the present invention will be able to be applied even in case the photoelectric element is formed of such semiconductor as CdS or CdSe.

By the way, the above described respective embodiments of the present invention can be applied not only to endoscope photographing devices fitted to endoscopes through such photographing adapters as camera adapters 5, photographing adapters or cameras 6 or directly but also to optical devices wherein a clear image is formed on a predetermined image forming surface by using lenses, for example, endoscopes incorporating the present invention, general cameras and microscopes.

I claim:

1. A focusing detecting device comprising
an optical system defining an optical axis between an image forming surface and an object to be photographed;
a light projecting means having a small aperture for projecting a light therethrough and along said optical axis onto the object to be photographed; and
a light receiving means having a small aperture for receiving light reflected from the object along said axis and a photoelectric converting surface adjacent said aperture with at least one of said aperture and said surface being in a position optically conjugate with the image forming surface said surface being disposed to emit a signal in response to the reflected light being received thereon whereby a focused state is detected with the reflected light being received within said aperture of said light receiving means.

2. A focusing detecting device according to claim 1 characterized in that each said aperture is pinhole-shaped.

3. A focusing detecting device according to claim 1 characterized in that each said aperture is slit-shaped.

4. A focusing detecting device according to claim 1 characterized in that each said aperture is annular.

5. A focusing detecting device according to claim 1 characterized in that said light projecting means is so formed as to project the light through a single aperture formed in the light receiving means.

6. A focusing detecting device according to claim 1 characterized in that said light projecting means is so formed as to project the light through a plurality of apertures formed in the light receiving means.

7. A focusing detecting device according to claim 1 characterized in that the light to be projected is a light of a wave length in a visible range.

8. A focusing detecting device according to claim 1 characterized in that the light to be projected is a light of a wave length in an infrared range.

9. A focusing detecting device according to claim 6 characterized in that said photoelectric converting surface is mounted on said light receiving means.

10. A focusing detecting device according to claim 1 wherein said light receiving means has a plurality of apertures conjugate with said image forming surface and on opposite sides of said photoelectric converting surface.

11. A focusing detecting device according to claim 1 further comprising a beam splitter for directing light to said respective single apertures of light projecting means and light receiving means.

12. A focusing detecting device according to claim 11 further comprising transparent members of different thickness in the light paths passing through the respective apertures in front of said beam splitter.

13. A focusing detecting device according to claim 1 wherein said light receiving means is a photoelectric element having said photoelectric converting surfaces thereon.

14. A focusing detecting device according to claim 1 characterized in that said light receiving means and light projecting means are contained in an endoscope.

15. A focusing detecting device according to claim 1 characterized in that said light receiving means and light projecting means are contained in a photographing adapter fitted to the endoscope.

16. A focusing detecting device according to claim 1 characterized in that said light receiving means and light projecting means are fitted to an endoscope directly.

17. A focusing detecting device as set forth in claim 1 wherein said optical system includes a movable lens for focusing of the object to be photographed and a drive means connected to and between said photoelectric converting surface and said lens for moving said lens in dependence on said signal.

18. A focusing setting device according to claim 17 characterized in that said driving means is so controlled that when said photoelectric converting surface is optically conjugate with said image forming surface said lens will be moved so that said signal may be of the minimum value or maximum value.

19. A focusing setting device according to claim 17 characterized in that said driving means is formed of a motor fitted with a gear on a rotary shaft.

20. A focusing setting device according to claim 19 characterized in that said driving means is contained in a photographing adapter to which an endoscope can be fitted and is so formed as to mesh said gear and a focusing ring of said endoscope with each other.

21. A focusing setting device according to claim 19 characterized in that said motor is contained in a photographing device fitted to an endoscope and is so formed as to mesh a gear contained in the photographing adapter and focusing ring of said endoscope with each other.

22. A focusing detecting device for an image forming surface comprising
an optical system defining an optical axis between the image forming surface and an object;
a light source for projecting a light along said axis to the object; and
a photoelectric element having at least one small aperture between said light source and said optical axis for projecting a spot of the light from said source onto the object and for receiving light reflected from the object along said axis and a photoelectric converting surface at a position optically conjugate with the image forming surface and about said aperture.

23. In combination,
a focusing detecting device for an image forming surface, said detecting device including an optical system having at least one movable lens in an optical axis between the image forming surface and an the light path will become respectively optically shorter and longer than of the aperture 52A' will become smaller. (By the way, in FIG. 32, the reference symbols XA, XA' and XA" represent respectively the optical positions of the respective apertures 52A, 52A' and 52A" by taking the thickness of the wedge-shaped prism 91 into consideration.) As shown in FIG. 4(a), the larger the deviation of the light path length, the larger the rate of becoming smaller.

On the other hand, the light reflected in the position a will be at the convergent point in the rear of the above mentioned pinhole-shaped aperture 52A', therefore the output PA" level of the photoelectric element 54A" receiving the light through the aperture 52A" will be the largest, then the output PA' level of the photoelectric element 54A' will be sized and the output PA level of the photoelectric element 54A will be the smallest as shown in FIG. 32(b).

In the same manner, the light reflected in the position c will be already at the convergent point in front of the pinhole-shaped aperture 52A' and will then expand and therefore the detected output level will be PA PA' PA" as shown in FIG. 32(c).

Thus, in case the focusing state is deviated, the output PA' level of the photoelectric element 54A' will become smaller than that of either of the photoelectric elements 54A and 54A" on both sides. Therefore, if the output levels of these photoelectric elements 54A, 54A' and 54A" are compared, whether the system is in the focusing state or in the nonfocusing state will be able to be known.

In the above mentioned sixteenth embodiment, in the case of detecting focusing or nonfocusing, the photographing (image forming) optical system will be able to be automatically set in the focusing state by moving the photographing lens 8, for example, by the following formation.

The amplifier 39 in the focusing detecting circuit 34 shown in FIG. 7 is formed of amplifiers 39A, 39A' and 39A" amplifying respectively the output signals of the respective photoelectric elements 54A, 54A' and 54A" as shown in FIG. 33 so that the comparing detecting circuit 40 in which these amplified signals are put will compare, for example, the outputs of the amplifiers 39A and 39A' and will also compare the outputs of the amplifiers 39A' and 39A" and further, by the formation of comparing them, when the output of the amplifier 39A' is maximum, the indicator 35 will be lighted to indicate focusing. Further, the comparing detecting circuit 40 will compare the outputs of the amplifiers 39A and 39A". When the output of the above mentioned amplifier 39A' is not maximum, for example, when the output of the amplifier 39A is maximum (of the three output PA, PA' and PA" levels), the photographing lens 8 will be moved rearward by the driving device 36. When the output of the amplifier 39A' becomes maximum to be in the focusing state, the indicator 35 will be lighted and the operation of the driving device 36 will be stopped. On the other hand, when the output of the amplifier 39A" is maximum, the photographing lens 8 will be moved in the direction reverse to the above and will be set in the focusing state.

The above mentioned sixteenth embodiment shows the case that the light projecting and receiving means for focusing detection are in three places but can be applied also to the cases in two and four or more places.

For example, in the case in two places, if the wedge-shaped prism is arranged as a means of varying the light path length so that the intermediate position between the respective apertures arranged just before the two light receiving photoelectric elements may be the position conjugate with the film 2 surface, by comparing the output levels detected by receiving the light with both light receiving photoelectric elements, when both output levels are equal, the focusing state will be known and whether the state is front or rear focusing will be known by which of the outputs of both light receiving elements is larger. Therefore, the photographing lens 8 may be moved by the driving device in response to the output signal.

In case the light is projected through many apertures and is received through many apertures, the position in which the output level of each light receiving element is maximum will be in the focusing state of the photographing lens 8 and therefore the deviation from the determined image forming position will be known. Therefore, the displacement of the photographing lens 8 can be detected from the light receiving element of the maximum output level.

By the way, in the light receiving means in the above mentioned sixteenth embodiment, the photo electric elements 54A, 54A' and 54A" are arranged respectively in the rear of the apertures 52A, 52A' and 52A" provided in the light intercepting plate 53A. However, instead of the above mentioned light receiving means, photoelectric elements provided with apertures can be arranged to detect focusing. In this case, in the focusing state, the output of the photoelectric element will become smallest (minimum). Further, the apertures in this case may be made non-light sensitive parts in the same manner.

The apertures 52A and 52B in the above mentioned siteenth embodiment may be closed with transparent members, that is, may be optical apertures passing the light.

Further, a means of varying the light path lengths wherein, instead of the wedge-shaped prism 91, a stepped transparent member is arranged so that the light path lengths to the respective apertures 52A, 52A' and 52A" may be respectively slightly different can be arranged.

The above mentioned sixteenth embodiment can be not only contained in the camera 6 side but also applied to other optical devices the same as in the other embodiments.

FIG. 34 shows a hard endoscope in which an embodiment of the focusing detecting device of the present invention is incorporated.

In an elongated inserted part, light guiding fibers 92 as illuminating light transmitting means emitting the illuminating light from the tip surface are arranged and an observing optical system wherein the image of such object to be photographed (indicated by the arrow 25) as an affected part in front of the inserted part 1 illuminated by the illuminating light emitted from the end surface of the light guiding fibers 92 will be formed by an objective optical system 93 and the thus formed optical image will be transmitted to an eyepiece part (operating part) 95 side by a relay optical system 94 as an image transmitting means (image transmitting optical system) and will be able to be observed by the observer or technician through an eyepiece optical system (eyepiece) 74 is arranged.

A light guiding mouthpiece part 2 is provided to project on the side part of the above mentioned operating part 95 and the light guiding fibers 92 inserted through the inserted part 1 are fixed at the rear end so that a illuminating light may be transmitted from a light source 96 through a light guiding cable 62 fitted at one end to this light guiding mouthpiece part 2.

Further, in the operating part 95, a beam splitting means (corresponding to the translucent mirror 9) formed by jointing two right prisms 9A and 9B is arranged in the front position on the optical axis 7 on which an optical image will be formed by the rearmost lens 94' of a relay optical system 94. On the optical axis 7 in the rear of the beam splitting means, the eyepiece optical system 74 is arranged in a movable lens frame not illustrated. An eyepiece window part in the rear of the eyepiece optical system 74 is sealed with a cover glass 97.

A photoelectric element 11 in which such aperture as a pinhole 15 is formed is arranged in the position in the rear (upper in the illustration) on an optical axis 7' incident along the optical axis 7 through the relay optical system 94 and reflected by the beam splitting means. Light guiding fibers 98 branched from the above mentioned light guiding fibers 92 within the hard endoscope 4 are arranged so as to be positioned at the emitting end just after the aperture.

The photoelectric element 11 is so formed as to be operatively connected with the eyepiece optical system 74 and is so set that, when the position in which the image of the object 25 to be photographed will be formed is formed in a clearly sighted distance (about 25 cm.) (from the observer) through the eyepiece optical system 74, the position of the aperture of the photoelectric element 11 will be optically conjugate. In other words, both of the eyepiece optical system 74 and photoelectric element 11 are so formed as to move forward and rearward as operatively connected with each other respectively on the optical axes 7 and 7' so that, in case the optical image transmitted and formed in front of the eyepiece optical system 74 by the relay optical system 94 is magnified and formed through the eyepiece optical system 74, when its position is the position of the optical image (before being magnified) in the clearly sighted distance, (the aperture of) the photoelectric element 11 will be positioned in the position conjugate with the position of the optical image (on the optical axis 7' reflected by the beam splitting means). The eyepiece optical system 74 and photoelectric element 11 are so formed as to be moved forward and rearward by rotating a focusing ring 73 formed on the outer periphery of the operating part 95.

Within the operating part 95, a focusing detecting circuit 34 for detecting whether the detecting output by the photoelectric element 11 is of the minimum value or not is contained so that, when the focusing detecting circuit 34 is judged to be in the focusing state, the lamp 14 connected to the output end will light and the light will be reflected by the beam splitting means and will be incident upon the side part of the observing visual field so as to be able to be sighted by the observer in the rear of the eyepiece optical system 74.

FIG. 35 shows a soft endoscope in which an embodiment of the present invention is incorporated.

Light guiding fibers 102 as illuminating light transmitting means are inserted through the elongated soft inserted part 101 of this soft endoscope (fiberscope) 100. An objective optical system 104 is arranged in the inside sealed with a cover glass 103 on the tip side of the inserted part 101.

A lens 104' of a part of the above mentioned objective optical system 104 is so formed as to be movable along the optical axis 7. Image guiding fibers 106 as image transmitting means (an image transmitting optical system) are so arranged as to be positioned on the tip surface to be an objective surface 105 near the position in which the image is formed by the objective optical system 104. A beam splitting means 107 formed by jointing (the sloped surfaces of) two right prisms 107A and 107B so that one prism 107A may contact on the rear end surface with the objective surface 105 is arranged.

The photoelectric element 11 in which such aperture 15' as is pinhole-shaped is formed is fitted to the rear end surface of the other prism 107A to be the optical axis 7' (upper in the illustration) reflected by the jointing surface of both prisms 107A and 107B of the beam splitting means 107. The position of this aperture 15' or the photoelectric surface 17 is so arranged as to be conjugate with the objective surface 105 of the above mentioned image guiding fibers 106.

In the rear of the aperture 15', the emitting end surface of partial light guiding fibers 108 branched from the light guiding fibers 102 inserted through the inserted part 101 is present so that the focusing detecting illuminating light may be emitted through the aperture 15'.

On the other hand, the image guiding fibers 106 are to transmit the optical image formed on the above mentioned objective surface 105 on the tip side to the rear end surface inserted to the operating part 109 side. Then a beam splitting means 110 formed by jointing two triangular prisms 110A and 110B, eyepiece optical system 111 and (eyepiece) cover glass 112 are arranged in turn along the optical axis 7 in the rear of this rear end surface. The eyepiece optical suystem 111 is so formed as to magnify and form the optical image on the rear end surface of the image guiding fibers 106 in a clearly sighted distance, for example, from the observer. A lamp (or LED or the like) 14 as a focusing indicating means is arranged in the rear of a light intercepting plate 113 in which a pinhole is formed as separated from the side surface of one triangular prism 110A forming the beam splitting means 110 and is so formed that, when it lights, the light of this lamp 14 will be reflected by the jointing surface of the two triangular prisms 110A and 110B, will pass through one triangular prism 110A, will proceed to the eyepiece optical system 111 in the rear and will be able to be sighted by the observer.

A focusing detecting circuit 34 for judging whether focusing is made or not with the detecting output of the photoelectric element 11 is contained in the operating part 109 so that, at the time of focusing, the lamp 14 will be lighted with the output of the focusing detecting circuit 34.

On the focusing ring 73 formed on the outer periphery of the operating part 109, a ring-shaped member 115 fitted and fixed on the inner peripheral surface of the focusing ring 73 and having a spiral groove 114 formed on the inner periphery is contained in a recess formed along the outer periphery of the operating part body 116 so as to be rotatable together with the focusing ring 73.

A cam pin 117 is contained on the tip side in the spiral groove 114, a linear groove 118 along the optical axis 7 direction is formed in the operating part body 116 in which the recess is formed and the cam pin 117 provided to project on a slidable ring-shaped member 119 arranged inside the operating part body 116 passes object, a light projecting means for projecting a light through a small aperture and along said axis to the object and a light receiving means having at least one small aperture for receiving light reflected from the object along said axis and a photoelectric converting surface near a position optically conjugate with the image forming surface for emitting an electric signal ouput in response to light thereon; and a focusing setting device including a driving means for moving said lens of said optical system in response to said electric signal output to focus an image of the object on the image forming surface.

24. A focusing detecting device comprising
an optical system defining an optical axis between an image forming surface and an object to be photographed;
a light projecting means having at least two small apertures for projecting light therethrough and along said optical axis onto the object to be photographed; and
a light receiving means having at least a pair of small apertures for receiving light reflected from the object along said axis and a photoelectric converting surface adjacent said apertures, at least one of said surface and said pair of apertures being in a position optically conjugate with the image forming surface, said surface being disposed to emit a signal in response to the reflected light being received thereon whereby a focused state is detected with the reflected light being received within said aperture of said light receiving means.

25. A focusing detecting device comprising
an optical system defining an optical axis between an image forming surface and an object to be photographed;
at least one pair of light projecting means, each means having a small aperture for projecting light therethrough and along said optical axis onto the object to be photographed; and
at least one pair of light receiving means disposed on opposite sides of a plane optically conjugate with said image forming surface, each light receiving means having a small aperture for receiving light reflected from the object along the axis and a photoelectric converting surface adjacent said aperture for emitting a signal in response to the reflected light being received thereon whereby a focused state is detected by equal signals emitted from said surfaces.

26. A focusing detecting device as set fourth in claim 25 which further includes a plurality of said light receiving means are disposed in a plane inclined to said plane optically conjugate with said image forming surface.

27. A focusing detecting device as set forth in claim 25 wherein each light receiving means is a photoelectric element having said photoelectric converting surface thereon.

28. A focusing detecting device as set fourth in claim 25 wherein said optical system includes a movable lens for focusing of the object to be photographed and a drice means connected to and between each said photoelectric converting surface and said lens for moving said lens in dependence on said signals from said surfaces.

29. A focusing setting device according to claim 28 characterized in that said driving means is so controlled that when said photoelectric converting surfaces are formed in two places in front and rear of the position optically conjugate with the image forming surface, the signals from the respective photoelectric converting surfaces will be compared and said lens will be moved so that both output levels may be equal to each other.

30. A focusing setting device according to claim 28 characterized in that said driving means is so controlled that when said photoelectric converting surfaces are formed in three or more places in front and rear of the position optically conjugate with the image forming surface said lens will be moved so that the electric signal output level from the specific photoelectric surface may be minimum or maximum.

31. A focusing detecting device comprising
an optical system defining an optical axis between the image forming surface and an object;
a light source for projecting a light along said axis to the object;
a first plate having an aperture between said light source and said axis for passing a spot of light from said source;
a photoelectric element for receiving light reflected from the object along said axis for emitting a signal in response to the amount of light received thereon; and
a second plate having an aperture between said axis and said element at a position optically conjugate with the image forming surface whereby a focused state is detected with said element emitting a signal of maximum output level.

* * * * *

UNITED STATES PATENT AND TRADEMARK OFFICE
CERTIFICATE OF CORRECTION

PATENT NO.   : 4,538,062

DATED        : August 27, 1985

INVENTOR(S)  : Yoshio Shishido

It is certified that error appears in the above-identified patent and that said Letters Patent is hereby corrected as shown below:

```
Column  3, line  8 change "pihhole" to -pinhole-
Column  6, line 17 change "a rear" to -the rear- Column  9, line 60 change "prisms" to -prism-
Column 11, line 58 change "it so" to -is so-
Column 12, line 64 change "the above" to -the-
Column 14, line 31 Change "joining" to -jointing-
Column 16, line 26 change "pinholeshaped" to -pinhole-shaped-
Column 18, line 26 change "in" to -is-
Column 23, line  2 change "that a" to -that an-
Column 24, line 35 change "soystem" to -system-
Column 28, line  3 change "of light" to -of the light-
```

Signed and Sealed this

Eleventh Day of March 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,538,062
DATED : August 27, 1985
INVENTOR(S) : Yoshio Shishido

It is certified that error appears in the above-identified patent and that said Letters Patent is hereby corrected as shown below:

```
Column  3, line  8 change "pihhole" to -pinhole-
Column  6, line 17 change "a rear" to -the rear- Column  9, line 60 change "prisms" to -prism-
Column 11, line 58 change "it so" to -is so-
Column 12, line 64 change "the above" to -the-
Column 14, line 31 Change "joining" to -jointing-
Column 16, line 26 change "pinholeshaped" to -pinhole-shaped-
Column 18, line 26 change "in" to -is-
Column 23, line  2 change "that a" to -that an-
Column 24, line 35 change "soystem" to -system-
Column 28, line  3 change "of light" to -of the light-
```

Signed and Sealed this

Eleventh Day of March 1986

[SEAL]

Attest:

DONALD J. QUIGG

Attesting Officer

Commissioner of Patents and Trademarks